(12) United States Patent
Krehel

(10) Patent No.: US 6,208,985 B1
(45) Date of Patent: Mar. 27, 2001

(54) DATA REFINERY: A DIRECT MANIPULATION USER INTERFACE FOR DATA QUERYING WITH INTEGRATED QUALITATIVE AND QUANTITATIVE GRAPHICAL REPRESENTATIONS OF QUERY CONSTRUCTION AND QUERY RESULT PRESENTATION

(75) Inventor: Gregory A. Krehel, Ponte Vedra, FL (US)

(73) Assignee: Caseventure LLC, Ponte Vedra Beach, FL (US)

( * ) Notice: Subject to any disclaimer, the term of this patent is extended or adjusted under 35 U.S.C. 154(b) by 0 days.

(21) Appl. No.: 08/891,306

(22) Filed: Jul. 10, 1997

(51) Int. Cl.$^7$ .................................................... G06F 17/30

(52) U.S. Cl. ....................................... 707/3; 707/4

(58) Field of Search .................... 707/3, 4, 102, 707/101

(56) References Cited

U.S. PATENT DOCUMENTS

| | | | |
|---|---|---|---|
| 5,047,960 | 9/1991 | Sloan | 364/523 |
| 5,175,814 | 12/1992 | Anick et al. | 395/161 |
| 5,263,167 | 11/1993 | Conner, Jr. et al. | 395/700 |
| 5,265,246 | 11/1993 | Li et al. | 395/600 |
| 5,428,776 | * 6/1995 | Rothfield | 395/600 |
| 5,491,783 | * 2/1996 | Douglas et al. | 395/159 |
| 5,515,488 | * 5/1996 | Hoppe et al. | 395/140 |
| 5,561,758 | 10/1996 | Hocker et al. | 395/159 |
| 5,576,946 | * 11/1996 | Bender et al. | 364/146 |
| 5,680,605 | 10/1997 | Torres | 395/603 |
| 5,715,444 | 2/1998 | Danish et al. | 395/604 |
| 5,734,888 | 3/1998 | Li et al. | 395/604 |

OTHER PUBLICATIONS

Dyer, Scott D., "A Dataflow Toolkit for Visualization", IEEE Computer Graphics and Applications, pp. 61–69, Jul. 1990.

(List continued on next page.)

*Primary Examiner*—Wayne Amsbury
*Assistant Examiner*—Cheryl Lewis
(74) *Attorney, Agent, or Firm*—Fenwick & West LLP

(57) ABSTRACT

A system, method, and user interface for a software product provides for an integrated user interface with both query construction and query result presentation graphically represented to the user in a common graphical space. The user can construct a query using graphical representations of refine operations, including filter and tag operations. The refine operation is executed upon a number of input records from a database. The refine operation selects or identifies a number of records that satisfy the user defined criteria of the operation. Graphical representations of input and output data for each operation are displayed, and sized so that the graphical size of the output representation relative to the graphical size of the input representation is approximately equal to the ratio of the number of output records to the number of input records. Multiple refine operations may be defined, so that the graphical representation of the output of one operation becomes the input of a subsequent operation. In this manner, there is provided a common visual metaphor for both query construction and query result presentation, enabling the user to both qualitatively and quantitatively assess query results in the context of the overall database data.

21 Claims, 23 Drawing Sheets

(22 of 23 Drawing Sheet(s) Filed in Color)

Microfiche Appendix Included
(3 Microfiche, 123 Pages)

OTHER PUBLICATIONS

Balkir, N. H., Sulkan, E., Ozsoyoglu, G., Ozsoyoglu Z. M., "VISUAL: A Graphical Icon–Based Query Language", Proceedings of the Twelfth International Conference on Data Engineering, pp. 524–533, Feb. 26 –Mar. 1, 1996.

Catarci, T., Santucci, G., "Query by Diagram: A Graphical Environment for Querying Databases", Proceedings of the 1994 ACM SIGMOD International Conference on Management of Data, vol. 23, Issue 2, p. 515, Jun. 1994.

Fogg, D., "Lessons from a "Living In a Database", Graphical Query Interface", SIGMOD "84 Proceedings of Annual Meeting, vol. 14, No. 2, pp. 100–106, Boston, MA, Jun. 18–21, 1984.

Huang, K., "Visual Business Graphics Query Interface", Advanced Computer Graphics, Proceedings of Computer Graphics Tokyo "86, pp. 233–243, 1986.

McDonald, N. H., "Video–graphic query facility for database retrieval", The Visual Computer, vol. 2, pp. 72–77, 1986.

Phillips, R. L., "A Query Language for a Network Data Base with Graphical Entities", Computer Graphics, A Quarterly Report of SIGGRAPH–ACM, SIGGRAPH "77 Proceedings, vol. 11, No. 2, pp. 179–185, Jul. 20–22, 1977.

Wong, H. K.T., Yeh, W., "A Graphical Query System for Complex Statistical Databases", Computer Science and Statistics: Proceedings of the Fifteenth Symposium on the Interface, pp. 35–49, Houston, Texas, Mar. 1983.

Consens, M. P., Mendelzon, A. O., "Expressing Structural Hypertext Queries in GraphLog", Hypertext "89 Proceedings, pp. 269–292, Nov. 1989.

Gentner, D. R., Grudin, J., "Design Models for Computer–Human Interfaces", IEEE Computer Society, pp. 28–35, Jun. 1996.

Godin, R., Gecsei, J., Pichet, C., "Design of Browsing Interface for Information Retrieval", Proceedings of the Twelfth Annual International ACMSIGIR Conference on Research and Development in Information Retrieval, pp. 32–39, Cambridge, Massachuseets, Jun. 25–28, 1989.

Michard, A., "Graphical presentation of boolean expressions in a database query language: design notes and an ergonomc evaluation", Behaviour and Information Technology, vol. 1, No. 3, pp. 279–288, 1982.

Dyer, Scott D., "A Dataflow Toolkit for Visualization", IEEE Computer Graphics and Applications, pp. 61–69, Jul. 1990.

* cited by examiner

Parts of the Query Construction Area

Parts of the Bay Status Tab

Parts of the Scratch Refiners Tab

Parts of the Favorites Tab

Query Construction Area and Bay Status Tab Prior to Refine Operation
Definition

Creation of a Refiner Using the Scratch Refiners Tab

The Addition of a Criterion to an Existing Refiner

Dialog Box
for Determining How a New Criterion Should Be Added to an Existing Refine Operation Filter Bay with Multiple Criteria Modification of a Criterion that Makes Up a Refiner Creating a Refiner Using the Favorites Tab Running a Filter Operation Database Table Prior to Running a Filter Operation Database Table Following Running of a Filter Operation Running a Tag Operation from Tag Bay 1

Running a Tag Operation from Tag Bay 2

Database Table Displaying the Results of One Tag Operation

Database Table Displaying the Results of Two Tag Operations

Definition of Serial Filter, Tag 1, and Tag 2 Operations

Running a Filter Operation, Prior to Running Tag 1 and Tag 2 Operations

Serial Filter and Tag 1 Operation, Prior to Running a Tag 2 Operation

Multiple, Serial Operations

DATA REFINERY: A DIRECT MANIPULATION USER INTERFACE FOR DATA QUERYING WITH INTEGRATED QUALITATIVE AND QUANTITATIVE GRAPHICAL REPRESENTATIONS OF QUERY CONSTRUCTION AND QUERY RESULT PRESENTATION

MICROFICHE APPENDIX

This application includes a microfiche appendix, including 3 sheets of microfiche and a total of 138 frames.

The file of this patent contains 23 sheets of formal drawings executed in color. Copies of this patent with color drawings will be provided by the Patent and Trademark Office upon request and payment of the necessary fee.

BACKGROUND

1. Field of Invention

The present invention relates to user interfaces for querying databases, and more particularly to graphical user interfaces providing for graphical query construction and result presentation.

2. Background of Invention

Conventionally, database query and retrieval systems perform several basic types of retrieval operations. In a relational model, these include restricting operations that retrieve from a set of records, a subset of records that satisfies specified conditions. For the purposes of the present invention, restricting operations are referred to as "refine" operations, and may be further categorized as either filter or tag operations, depending on how the resulting information is displayed to the user. In a filter operation, only the retrieved subset of records is displayed to the user; in other words, the operation filters a subset of records from a larger set of records. In a tag operation, both the original set of records and the retrieved subset are displayed, but the retrieved subset is visually distinguished within the context of the larger set of records.

Various approaches have been made to providing graphical user interfaces for database systems. At best, these user interfaces focus solely on the problem of query construction, and as a result provide only graphical tools to construct queries for the database. Existing approaches have a number of significant difficulties:

Conventional systems do not provide the visual metaphor of the filtering and tag operations. Conventional systems do not recognize the distinction between filtering and tagging, and hence provide no visual distinction between the different presentations of filtering and tag operations.

Conventional systems provide little or no graphical visual feedback about the status of the filtering or tag operation.

Conventional systems typically do not provide a drag-and-drop mechanism for visually constructing refining operations using direct manipulation. Typically, the user must type in the criteria or parameters for each operation.

Conventional systems require the user to leave one window and go to a dialog box to define query parameters, and thereby do not provide a single integrated user interface for both query construction and result presentation.

Conventional systems do not support multiple concurrent tag operations using multiple tagging criteria. This prevents the user from seeing and interpreting the results of several different tag operations simultaneously. As a result, the user must iteratively perform tag operations.

Conventional systems do not provide graphical, qualitatively interpretable feedback of the quantitative effects of applying filters and tags to data directly integrated in a single visual space with the query construction representation. Rather, conventional systems merely return data results in a separate visual space. At best, query results are provided in graphical format, such as a bar chart, pie chart, or the like, but this graphical representation is unrelated to any visual metaphor or representations used for query construction.

Accordingly, it is desirable to provide an improved, integrated, direct manipulation user interface for graphically constructing database queries and presenting query results using a common visual metaphor and graphical representations for query construction and result presentation.

SUMMARY OF THE INVENTION

The present invention overcomes the limitations of conventional graphical query systems by integrating graphical query construction and graphical representations of query results into a single user interface. The integrated user interface enables the user to both construct database queries in a graphical, direct manipulation manner using different iconographic representations of filtering and tag operations, and to view graphical representations of the quantitative impact of such operations. The user not only can view the graphical representations of query results, but can also perform subsequent tasks and functions in either in a table presentation of tagged or filtered data, or in the graphical query construction area, based on the data the user is viewing in either area.

In one embodiment, the present invention operates in conjunction with a conventional database management system for storing and retrieving a plurality of records or items. The present invention provides a graphical user interface display that includes two display portions: a top portion making up what is hereinafter referred to as the query construction area and the bottom portion making up what is hereinafter referred to as the Refiner Control tabs. The query construction area may be understood as a graphical area for displaying graphical representations of a refine operation, and of database items prior to and after execution of the refine operation. A first area of the query construction area is for graphically representing a first plurality of items in the database prior to a refine operation, which may be a filter operation or a tag operation, depending on its placement in the query construction area. The graphical representation is preferably sized to represent the quantity of these items prior to the refine operation. A second area of the query construction area is for graphically representing a second plurality of items that is a subset of the first plurality, and that result from the processing of the refine operation on the first plurality of items. By representing both first and second sets of items in the query construction area, a common visual metaphor is provided that enables the user to manipulate and interpret query results directly in the context of query construction.

Displayed between the first area and the second area in the query construction area is an icon bay, a shaped protuberance, that receives a correspondingly shaped refine icon representing and associated with at least one refine operation. Where the icon bay is defined as processing filter operations, then the icon bay is called a filter bay, and a refine icon placed therein is a filter icon visually indicating a filter operation. For example, a filter bay may have a rectangular shape and a filter icon have a corresponding rectangular shape that fits inside the filter bay. The filter operation associated with the filter icon is defined by the user to filter the first plurality of items by satisfying various criteria or tests, for example, by having certain values for certain data fields or attributes. By way of example, in a database of dated records, a filter operation that may be associated with a filter icon is to filter items having a certain date value.

For a filter operation, the user defines the refine operation and places its icon in the filter bay. A first graphical representation of the first plurality of items input into the filter operation is displayed. The filter operation associated with the filter icon is executed on the first plurality of items, and thereby identifies or selects the second plurality of items. A graphical representation for the second plurality of items is determined and displayed in the second area of the query construction area. This second graphical representation is sized relative to a first graphical representation of the first plurality of items in approximately the same ratio as the second plurality of items is to the first plurality of items. For example, if the first plurality of items is 100 items, and as a result of the filter operation, the second plurality of items contains 50 items, then the second graphical representation is about half as large as the first graphical representation shown in the first area of the graphical construction area.

Where the icon bay is defined as processing tag operations, then the icon bay is called a tag bay, and a refine icon placed therein is a tag icon visually indicating a tag operation. A tag bay may have a rounded rectangular shape and a tag icon have a corresponding rounded rectangular shape that fits inside the tag bay. The query construction area further includes a third and fourth area which operate in the same relative manner to each other as the first and second areas, as described above, but with respect to the tag operation. The tag operation associated with the tag icon is defined by the user to tag the items that satisfy various criteria or tests. By way of example, in a database of dated records a tag operation that may be associated with a tag icon is to tag items having a certain date value.

In a tag operation, the user defines the refine operation and places its icon in the tag bay. The tag operation associated with the tag icon is executed, and thereby identifies a retrieved subset. In tagging, both the original set of records and the retrieved subset are displayed, but the retrieved subset, the tagged subset, is visually distinguished within the context of the larger set of records. The visual distinguishing feature may be a color, font, or icon applied to each tagged record. A graphical representation for the retrieved subset is determined and displayed in the fourth area corresponding to the tag bay of the query construction area. This graphical representation of the tagged subset is sized relative to a graphical representation of the input set for the tag operation in the third area, in approximately the same ratio as the retrieved subset is to the original set of records. For example, if the input set of items to the tag operation is 100 items, and as a result of the tag operation, 50 items are tagged, (e.g. colored), the second plurality of items still contains 100 items, but the graphical representation of the tagged subset is about half as large as the graphical representation of the input set shown in the third area of the query construction area.

The present invention may also be understood as a new visual metaphor for query construction and result presentation for query operations on a database. The query construction area is likened to a pipe through which water flows. The amount of water flowing through the pipe may be restricted by placing obstructions within the pipe. In this view of the present invention, data from the database is represented as streams flowing through the query construction area. The query operations are represented by icons in the query construction area. Like water, the input data for query operations are graphically represented as streams that flow into an icon associated with the query operation, and output data produced by a query operation is graphically represented as streams that flow out of, or away from such icon.

In a real water pipe, when the flow of water is restricted at some point, the water level in the pipe after the restriction point is less than, and related to the input water level. So too in the present invention, the size of the graphical representation of the streams of output data of query operation is a percentage of and related to the size of the input streams of data.

More particularly the filter operations and their filter icons, correspond visually to such obstructions and reduce or restrict the flow of data through the query construction area.

Similarly, water flowing in a pipe may also have various substances in it, such as minerals, particulates, and the like. Such materials may be visually identified using tints which latch onto the materials, and make them visible. These tints may be applied as the water flows through a screen or other item containing the tint that is placed in the pipe. In the user interface of the present invention, the tag operations and their respective tag icons correspond visually to such tinting devices, and tag the data streams flowing through the query construction area.

The icon bays of the query construction area may be understood to correspond to fittings within a pipe where screens or obstacles are attached to secure them in the pipe.

The present invention further provides that the user can directly define the attributes of a refine operation in the same user interface as the query construction area, including the selection of criteria or attributes for a refine operation, the boolean operation for any attributes, and the logical (conjunctive or disjunctive) operations between multiple criteria.

In this manner, the user interface of the present invention provides a fully graphical integrated mechanism for both query construction and result presentation. The graphical representation of the second plurality of items, relatively sized to the first graphical representation of the first plurality of items enables the user to immediately perceive the impact of the filter operation on the database.

With this basic architecture and methodology in place, the present invention provides for numerous features and advantages. First, the iconic encapsulation of a refine operation enables the user to create, store, and recall multiple different refine operations and efficient and easy manipulation. The user can select previously defined refine operations and apply them by graphically moving them from a storage location on a Favorites tab into the icon bay.

Second, the iconic architecture and methodology of the present invention enable multiple filter and tag operations to be serially applied in the user interface. That is, multiple instances of filter icons or tag icons may be used in the query construction area, with the graphical representation of the output of one operation being applied as the graphical representation of the input of the next operation. Returning to the pipe metaphor, this is like placing multiple obstacles or tagging screens in the pipe, where the outflow of water from one obstacle becomes the inflow of water to a next obstacle or screen. Thus, the present invention provides a single, consistent visual metaphor in which both query construction and query result presentation can be displayed and manipulated by the user.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE PREFERRED EMBODIMENT

System Overview

Figure 1:
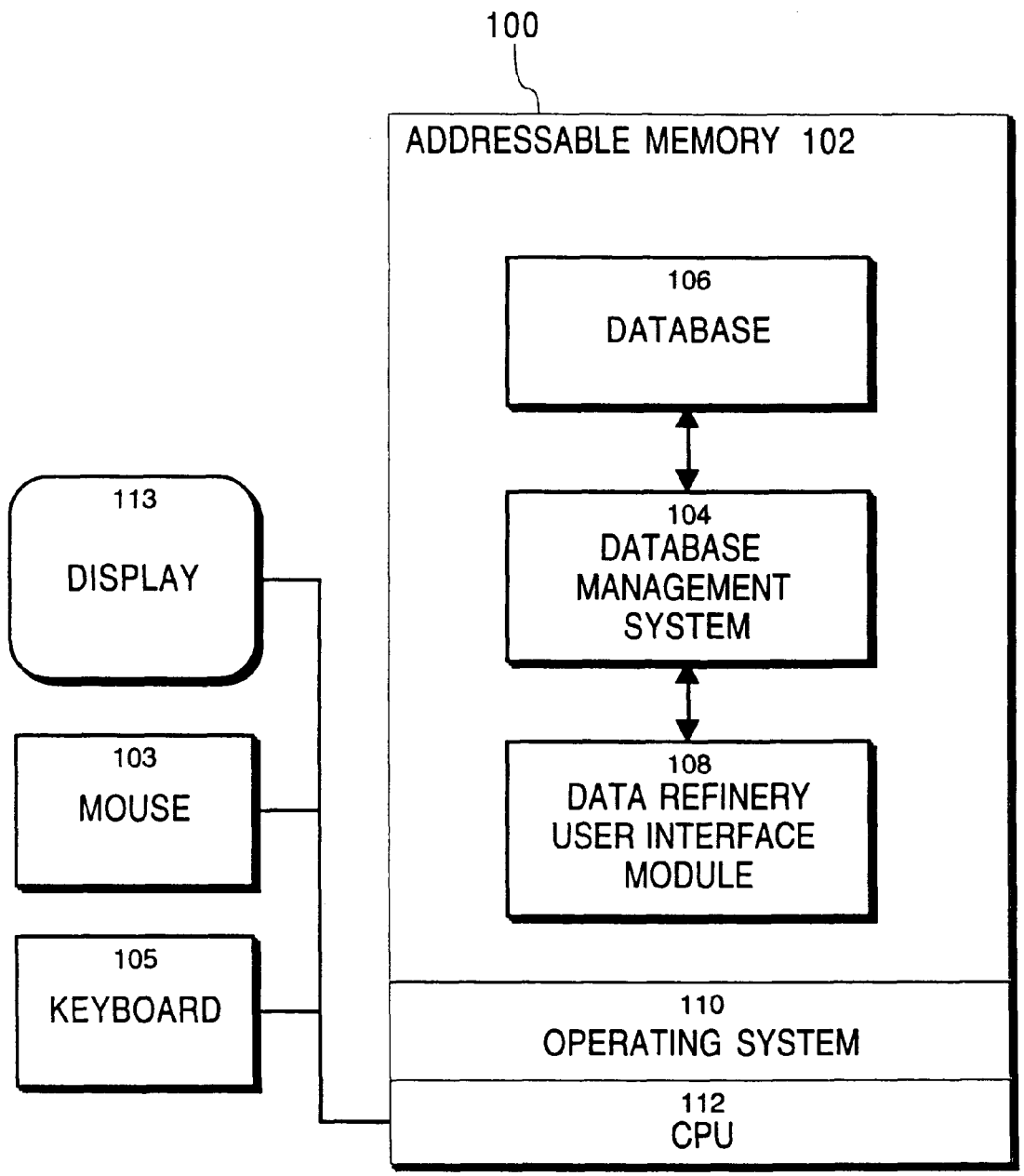
FIG. 1 is an illustration of a computer system providing a hardware environment for the present invention.

Referring now to FIG. 1 there is shown one embodiment of a hardware environment for implementing the present invention. The present invention may be implemented on a conventional computer 100 including a processor 112, addressable memory 102, storage devices, mouse 103, keyboard 105, and display 113. The computer 100 executes a conventional operating system 110, such as Microsoft Corp.'s Windows 95™, or Windows NT™. In one embodiment, addressable memory 102 includes a software product in accordance with the present invention, such as a database management system 104 coupled to a database 106, and a user interface module 108 referred to herein as the "Data Refinery" 108. The Data Refinery 108 may be implemented as part of a variety of different software products executable by the computer 100, such as the database management system 104, spreadsheets, word processors, scientific analysis tools, litigation support tools, and the like.

The database management system 104 and database 106 are preferably implemented using a relational database system, though other database models, such as object oriented, or hierarchical may be used. The database management system 104 provides conventional data definition and data manipulation facilities, preferably as C or C++ implementations of Structured Query Language, for defining the database schemas of the database 106, and for executing refining operations on the database 106 to retrieve records or items therefrom. The database 106 stores a plurality of records or items, again preferably in conventional relational form in which there are a plurality of entities (tables), each entity defined by plural attributes (fields), where the attributes may take values from defined domains. The Data Refinery 108 interfaces with the database management system 104 to receive user queries, to retrieve records in the database 106 and to display the results of such queries to the user.

User Interface Overview

Figure 2:
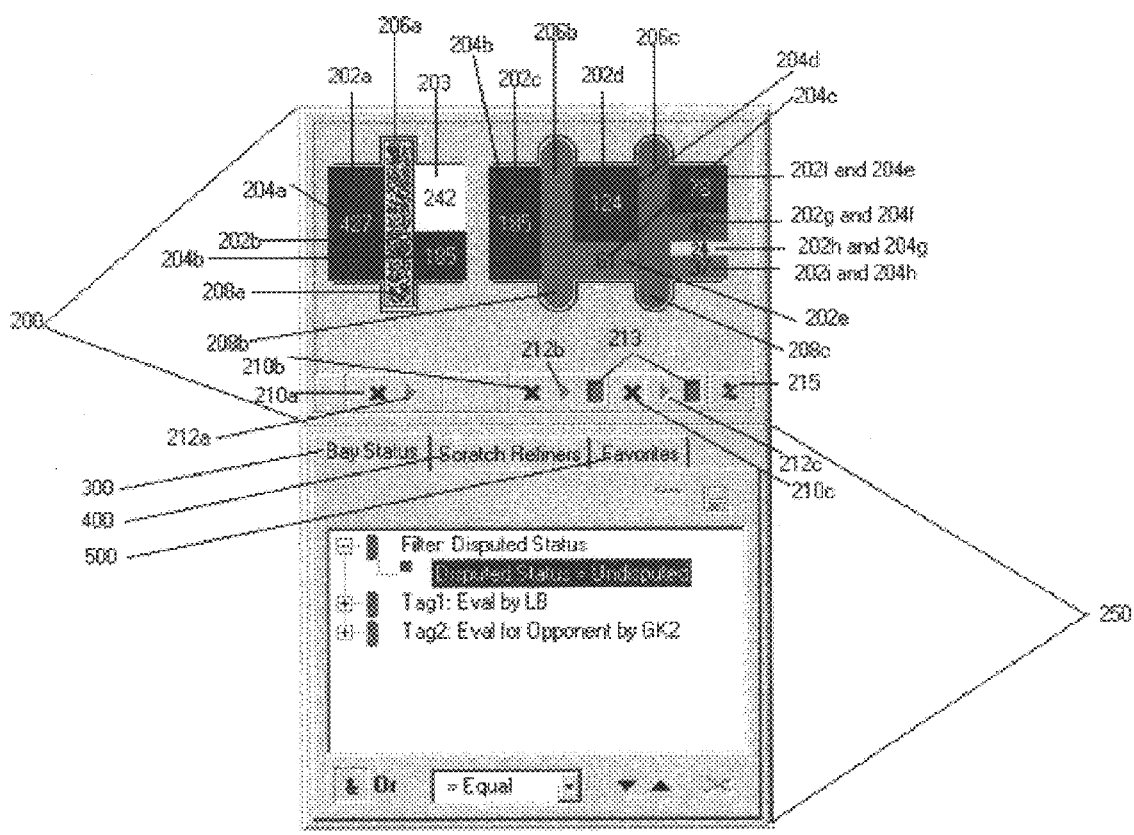
FIG. 2 is an illustration of the user interface of the present invention in an example operation identifying the parts of the query construction area.

Referring now to FIG. 2, there is shown an example of a portion of the user interface display of the Data Refinery 108 following construction and execution of three queries on the database 106 using three refine operations. This portion of the user interface display includes the query construction area 200 and the Refiner Control tabs 250, including tabs for Bay Status 300, Scratch Refiners 400, and Favorites 500. (For the purposes of this disclosure, a "refiner" is the same as a "refine operation.")

The query construction area 200 includes a number of shaped icon bays 208: Filter Bay 208a, Tag Bay 1 (208b), and Tag Bay 2 (208c). In this disclosure, references to an element by an unsubscripted reference number, e.g. "208", are general references to all instances of the reference number, e.g. "208a" and "208b" and "208c". Within each icon bay 208, there is displayed a refine icon 206, which may be either a filter icon 206a or a tag icon 206b or 206c. A refine icon 206 has a shape corresponding to the shape of the icon bay 208 for its type of operation. In this disclosure references to "refine icon" are to be understood as including either filter icon 206a or tag icons 206b and 206c, depending upon which icon bay 208 the refine icon 206 is inserted. In this embodiment of the Data Refinery 108, the query construction area 200 has one icon bay 208a having a rectangular shape, and referred to as a Filter Bay, specifically for receiving correspondingly shaped filter icons 206a for filter operations, and two tag icon bays 208b, 208c having a rounded rectangular shape (referred to as Tag Bays), specifically for receiving correspondingly shaped tag icons 206b and 206c, associated with tag operations. In alternative embodiments, the number of icon bays may be increased, and their functionality generalized to accept either type of icon and operations. In alternative embodiments, icon bays 208 may be added dynamically as needed, i.e., any time a refine icon 206 is inserted in the query construction area 200.

Refine operations (including both filter and tag operations) are defined by the user, and describe a set of tests or criteria that are to be applied to an input set of items in the database 106 in order to produce an output set of items. Each criterion is defined by an attribute of an entity, a test value for the attribute, and a test operation (Boolean, arithmetic, and so forth). Multiple criteria may be applied as conjuncts (AND), or disjuncts (OR), or negated (NOT), to provide a robust set of refine operations. In the preferred embodiment, a refine operation having defined criteria becomes specifically a filter or tag operation only when its icon is moved into one of the icon bays 208. Any refine operation may be used as either a filter or tag operation by placing its respective icon in either a filter icon bay 208a or a tag icon bay 208b, or 208c. Thus, the placement of the refine icon 206 defines what type of operation be executed. This feature enables the user to define a number of different refine operations, and flexibly use these as either tag operations or filter operations, depending on the user's particular data analysis needs.

In an alternative embodiment, the user can select the type of operation during the process of defining the refine operation, though this limits the flexibility of the refine operations. The process of defining a refine operation is further described below.

Below each icon bay 208 in the query construction area 200 is a set of control buttons that control the execution of a refine operation (either filter or tag operation) once its respective icon 206 is placed in its corresponding icon bay 208. The run button 212a initiates execution of the filter refine operation upon a click with a mouse. Likewise, the run buttons 212b and 212c initiate execution of their corresponding tag operations. The cancel button 210a stops executing of a currently executing filter operation, i.e., cancels the refine operation in the Filter Bay 208a that corresponds to the cancel button 210a. Likewise, the cancel buttons 210b and 210c stop executing a currently executing tag operation, i.e., cancel the refine operation in Tag Bay 1 or Tag Bay 2, respective to its cancel button. Upon cancellation, the user is prompted by a message box to see if she wants to make the refine operation a favorite to be stored on the Favorites tab 500. These buttons are selectively enabled depending upon the state of the refine operation.

The visual flow of information in the query construction area 200 is from left to right. Accordingly, each icon bay 208 has both input and output stream 202. The streams 202 on the left side of an icon bay 208 are the input streams, and streams 202 on the right side of an icon bay 208 are output streams. The streams 202 graphically indicate a relative number of items prior to and resulting from the refine operation associated with the icon 206 in the icon bay 208. Generally then, an input stream 202 is a first area which graphically represents a first plurality of items prior to a refine operation, and an output stream is a second area graphically representing a second plurality of items resulting from the refine operation, the second plurality of items being a subset of the first plurality of items, and the icon bay 208 for receiving an icon 206 representing at least one refine operation, the icon bay 208 being displayed between the input and output streams 202.

The query construction area 200 thus, integrates both the construction of queries for the database with the presentation of results of such queries. This enables the user to construct further queries directly, graphically, in the context of the results of other queries. The integration results from using a common unit of graphical representation, the stream flow, for representing both query inputs and query results, and by graphically coupling these streams through a visual representation of a refine operation.

The color boxes 213 below each bay 208 indicate the color of the corresponding output stream 202 from the refine operation; clicking on the color box 213 displays a menu of color choices from which the user may select to change the color of the output stream 202.

To the far right of the control buttons is a toggle button 215 that toggles the display of the quantity values 203, 204 from either absolute quantity values as shown, or percentages.

Referring to FIG. 2, with respect to the leftmost icon bay 208a, shown on the left side of the filter icon 206a is an input stream 202a, which is a graphical representation of a first plurality of records in the database 106. The number of records prior to a filter operation is indicated by the quantity value 204a. This first plurality of records defines the input set for the filter operation associated with the filter icon 206a, that is, the set of records to which the filter operation is applied by the database management system 104. In this example, there are 427 records that are subject to the filter operation. On the right side of the filter icon 206a is the output stream 202b, which is a graphical representation of the second plurality of records resulting from the application of the filter operation on the first plurality of records, and thus represents the selected set of records. The quantity of the second plurality of records is represented by the quantity value 204b. In this example, as a result of the filter operation, 185 records are selected. The ratio of the graphical size, or display area, of the output stream 202b to the graphical size of the input stream 202a is approximately the same as the ratio of the second plurality of items to the first plurality of items. Thus, the area of the output stream 202b is approximately 43% of the area of the input stream 202a. The relative sizing of the input stream 202a and output stream 202b enables the user to immediately and qualitatively perceive the impact of the filter operating on the input set of records. Records not selected by the filter operation are displayed in the area 203 of the query construction area 203 to the right of the Filter Bay 208a and are visually distinguishable from the selected set of records which are selected by the filter operation. This allows the user to judge whether the filter operation was too narrow (not enough items selected) or too broad (too many items selected). Presentation of this information in the query construction area 200 integrates the query construction actions with the display of query results.

The integration of query construction with result presentation is further enhanced by the provision of additional icon bays 208b and 208c. In the example of FIG. 2, the second and third icon bays 208b and 208c, here shaped as rounded rectangles, hold respectively shaped tag icons 206b and 206c, each associated with a tag operation.

Referring to the middle icon bay 208b, Tag Bay 1, has a tag icon 206b placed therein. To the left of this tag icon 206b is its input stream 202c representing the quantity value 204b of the second plurality of records, and to its right is its output stream, composed of untagged data 202d, representing the quantity value of the fourth plurality of records 204d and tagged data 202e representing the quantity value of the third plurality of records 204c. Because this operation is a tag operation, which identifies matching records, but does not remove or restrict non-matching records, the output stream of a tag operation has two components, a tagged output stream 202e representing the quantity value 204c of the third plurality of records and an untagged output stream 202d representing the quantity value 204d of the fourth plurality of records. The tagged output stream 202e is a graphical representation of the subset of the items of the input stream 202c that satisfy the tag operation, that is, the tagged items. The untagged output stream 202d is a graphical representation of the subset of the items of the input stream 202c that do not satisfy the tag operation, the untagged items.

The ratio of the graphical size, or display area of the tagged output stream 202e to the graphical size of the input stream 202c for the tag icon in Tag Bay 1 is approximately the same as the ratio of the quantity 204c of tagged items to the quantity 204b of items in the input stream 202c of the tag icon 206b. Similarly, the ratio of the graphical size, or display area of the untagged output stream 202d to the graphical size of the input stream 202c for the tag icon in Tag Bay 1 is approximately the same as the ratio of the quantity 204d of untagged items to the quantity 204b of items in the input stream 202c of the tag icon 206b. Thus, the size of the tagged output stream 202e is about 33% ($\approx 61/185$) the size of input stream 202c for the Tag Bay 1, and the size of the untagged output stream 202d is about 67% ($\approx 124/185$) of the size of this input stream 202c. Again, graphical sizing and display of these components of the output stream provide for immediate qualitative comprehension of the impact of the tag operation upon the input stream.

As shown in FIG. 2, these untagged and tagged output streams, 202d and 202e respectively, are displayed also as the input streams into the tag icon 206c in the rightmost icon bay 208c, Tag Bay 2, and thus, form the sets of input data to the tag operation associated with this last tag icon 206c. Because there are now two distinct sets of data (the tagged items and the untagged items) to be processed by this last tag operation, the database management system 104 executes the tag operation associated with the tag icon 206c in Tag Bay 2 on both of these sets of data. Since the results of this tag operation apply to the results of the previous tag operation, and each tag operation (in Tag Bay 1 and Tag Bay 2) produces both tagged and untagged results, the output stream of the tag operation in Tag Bay 2 has four components: items tagged by both tag operations (202h) representing the quantity value 204g of a seventh subset of records; items tagged by the first tag operation and not the second (202i) representing the quantity value 204h of an eighth subset of records; items untagged by the first tag operation and tagged by the second (202g) representing the quantity value 204f of a sixth subset of records; and items untagged by both operations (202f) representing the quantity value 204e of a fifth subset of records. Each of these portions of the output stream is graphically represented to the right of tag icon 206c in Tag Bay 2, and the graphical size of each portion approximates the relative size of the quantity in the stream to the total number of items in the input stream 202d and 202e. To the right of each of these portions, there is displayed the quantity of records in the stream. The user may toggle the display to show the percentage of each portion relative to the input stream, using the % toggle button 215.

The control buttons beneath each icon bay 208a, 208b, and 208c reflect the status of the refine operation therein. Since all three operations have been executed, the run buttons 212a, 212b, and 212c are disabled, as the operations cannot be executed again. The cancel buttons 210a, 210b, and 210c are active, and any of the three operations may be independently canceled. Canceling the filter operation in the Filter Bay 208a results in the database management system 104 setting the tag operations back to an un-executed state in Tag Bay 1 (208b) and Tag Bay 2 (208c).

Referring to FIG. 2, below the control buttons of the query construction area are three Refiner Control tabs 250: a Bay Status tab 300; a Scratch Refiners tab 400; and a Favorites tab 500.

Figure 3:
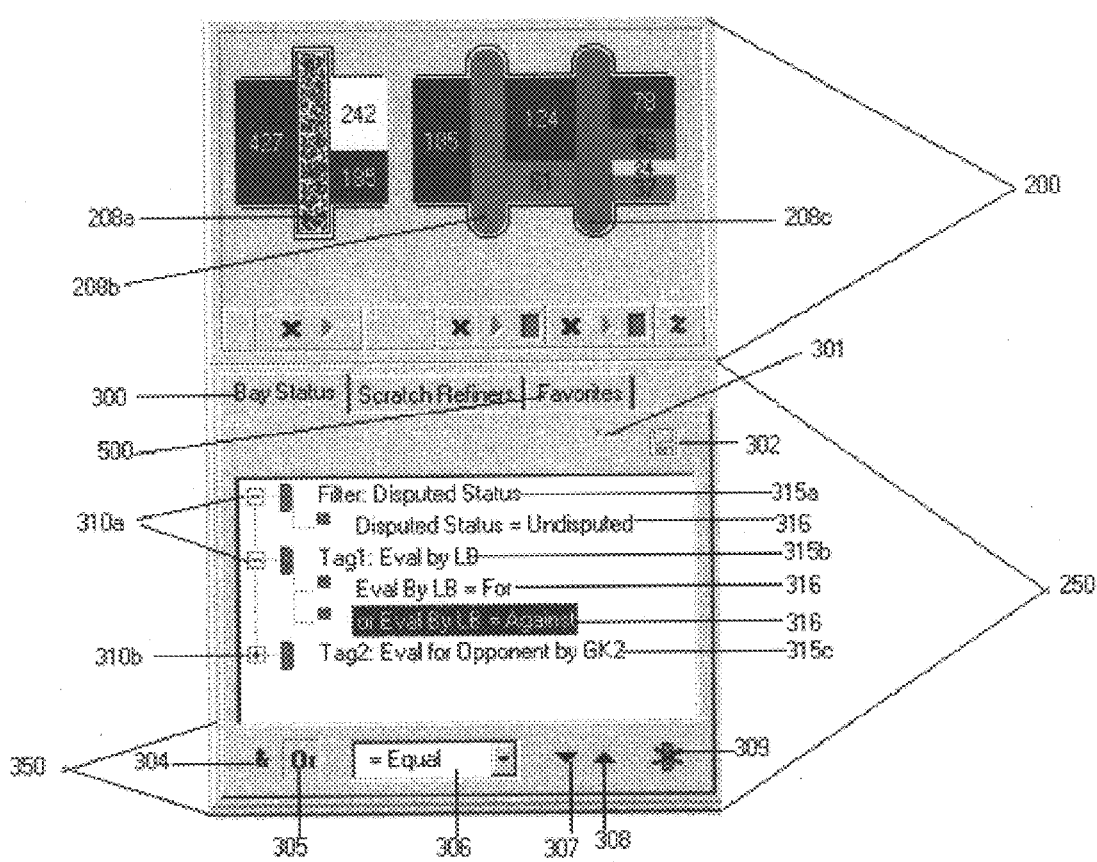
FIG. 3 is an illustration of the user interface of the present invention in an example operation identifying the parts of the Bay Status tab of the Refiner Control tabs.

As illustrated in FIG. 3, the Bay Status tab 300 provides information about the state of each of the Data Refinery's three icon bays 208 by displaying the status of each icon bay 208 and any refine icon 206 therein. Each status row 315a, 315b, and 315c of the Bay Status tab 300 corresponds to the status of the icon bays 208a, 208b, and 208c respectively. The first status row 315a indicates the status of the leftmost icon bay 208a. Referring to FIG. 3, the status information indicates the type of refine operation ("Filter"), the user provided name of the filter operation ("Disputed Status"), and that there is one criterion 316 associated with the refine operation with the value "Undisputed." Display of the number of criteria is useful to inform the user of the complexity of the refine operation, which may have a large number of conditions. The second and third status lines 315b and 315c similarly indicate the status of the remaining icon bays 208b and 208c. When the icon 206 for a refine operation is in an icon bay 208, the name of the refine operation displays in the Bay Status tab 300 and the user can see each criterion that makes up the refine operation by clicking the "+" node icon 310 next to the status row 315. A "+" node indicates a further level of refine operations below the node. A "−" node indicates no further level of refine operations below the node. If no refine icon 206 is present in an icon bay 208, the status row 315 indicates "Empty" as the name. By selecting the Rename Refine button 301, the user can change the name of a selected refine operation displayed in the Bay Status tab window 300.

By selecting the Make Favorite button 302, the user can make a selected refine operation a favorite to be stored on the Favorites tab 500, which allows for quick access to the refine operation at a later time to reuse that refine operation.

The Criterion Edit Panel 350 at the bottom of the Bay Status tab 300 includes the "And" with Previous Criteria button 304 and the "Or" with Previous Criteria button 305. These buttons allow the user to define whether a criterion is to be conjoined (AND) or disjoined (OR) with another criterion. As exemplified in FIG. 3, two criteria make up the refine operation in Tag Bay 1: (1) "Eval. by LB=For", (2) "Eval. by LB=Against" ("Eval." is the abbreviation used for "evaluated", "LB" are the initials of a user of the system). The "Or" with Previous Criteria button 305 is selected by the user to join these two criteria in an "or" logical relationship, so that items in the database 106 satisfying either criterion are tagged by the this refine operation. Clicking on the "And" button 304 would change the logical relationship between the criteria to "and", so that only items in the database 106 satisfying both criteria would be tagged by this refine operation. The scope of logical relationships for a refine operation are determined by the order of appearance of criteria in the Bay Status tab 300. For example, if there are three criteria listed in the order A, B, and C, then the scope of the logical operators is defined as (($A \times B) \times C$), where "×"

stands for either "and" or "or" as selected by the user. By extension, four criteria listed in the order A, B, C, and D, would be scoped as (((A×B)×C)×D). Alternatively, other methods may be used to determine the scope of logical operators, such as precedence hierarchies (e.g. "or" having precedence over "and") or indentation of criterion in the tab.

The Criterion Edit Panel 350 also includes a Qualifier list 306, whereby users can define a test operator of their criterion. The various available operators include equal, not equal, greater than, less than, and the like.

Also provided in the Criterion Edit Panel 350 are a Move Criterion Down button 307, a Move Criterion Up button 308, and a Delete Criterion button 309. To arrange the order of criteria in a refine operation, the user can click the Move Criterion Down button 307 or the Move Criterion Up button 308. Rearranging criterion order can change the way the refine operation impacts the data, given the manner in which the scope of logical relationships is resolved. Using the Delete Criterion button 309, the user can delete the criterion that is selected on the Bay Status tab 300.

Figure 4:
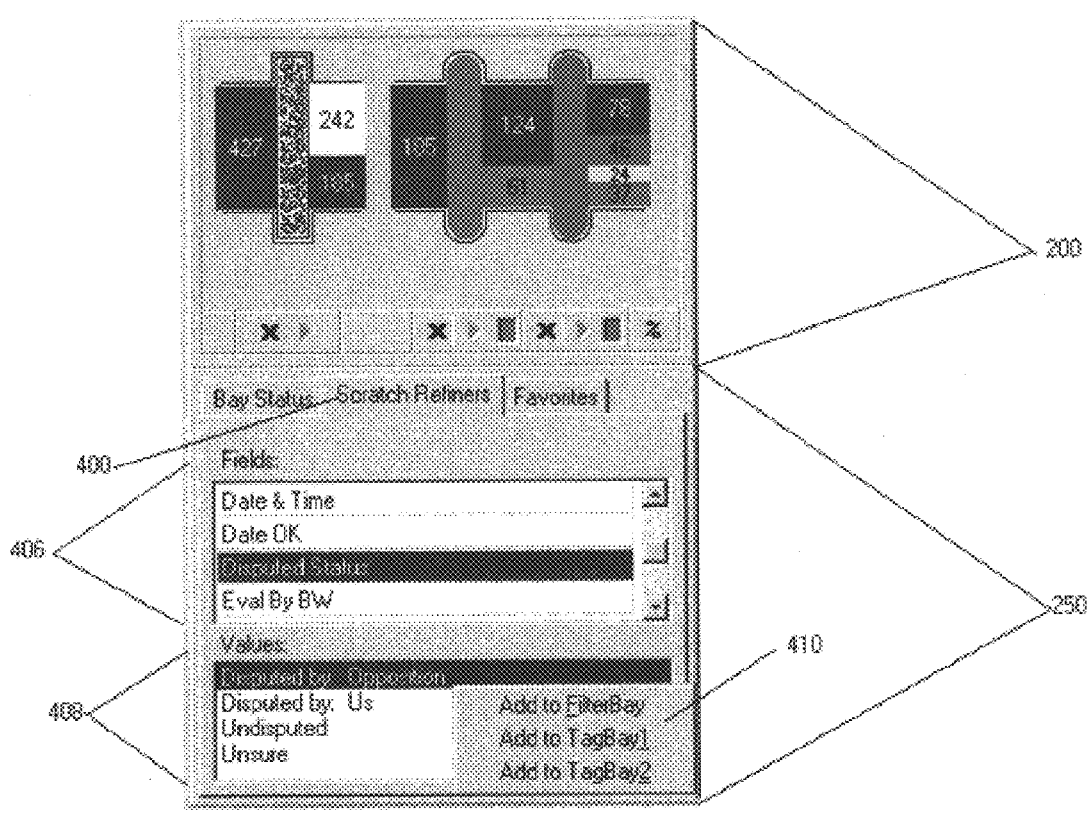
FIG. 4 is an illustration of the user interface of the present invention in an example operation identifying the parts of the Scratch Refiners tab of the Refiner Control tabs.
Figure 5:
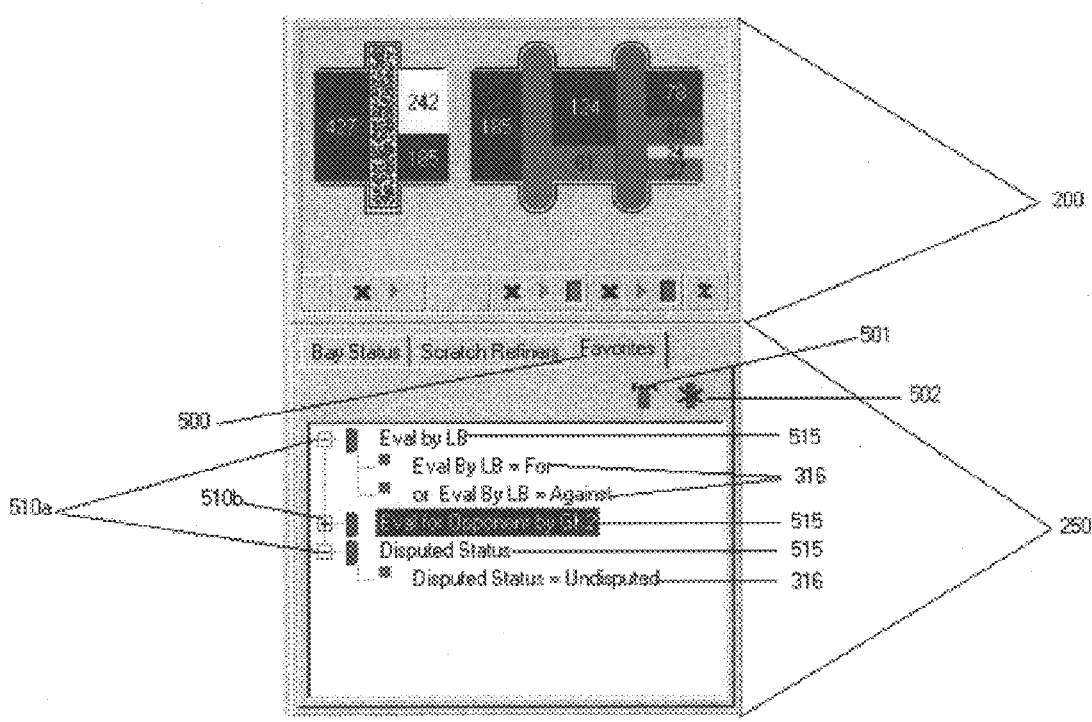
FIG. 5 is an illustration of the user interface of the present invention in an example operation identifying the parts of the Favorites tab of the Refiner Control tabs.

Briefly, there are two other Refiner Control tabs 250: the Scratch Refiner tab 400 (illustrated in FIG. 4) and the Favorites tab 500 (illustrated in FIG. 5). Referring to FIG. 4, the Scratch Refiners tab 400 displays all the fields (entity attributes) that can be used to filter and tag data, not just those records visible in the active plurality of entities. For example, even if the Disputed Status field is not applicable in the active plurality of entities being processed in the query construction area 200, the user can still create and run a refine operation that checks the Disputed Status of each entity in the database 106. Using the Scratch Refiners tab 400, the user can build refine operations from scratch. The Scratch Refiners tab 400 includes a Fields list 406 and a Values list 408 for defining the particular criterion of a refine operation. The Fields list 406 specifies all fields available for an item in the database 106 that can be used as a criterion. The Values list 408 specifies values of the selected field in the Fields List. The user can apply a refine operation from the Scratch Refiners tab 400 to the query construction area 200 by using a drag-and-drop operation, which is made available through Microsoft Corp.'s Windows95 application programming interface.

Referring to FIG. 5, the Favorites tab 500 of the Refiner Control tabs 250 displays stored refine operations in the refine window Favorites tab 500. The Favorites tab 500 lists previously created and saved refine operations 515, thereby providing easy and efficient manipulation of such operations for future use. Using the Rename Refine button 501, the user can change the name of a selected refine operation 515 on the Favorites tab 500. Using the Delete Refine button 502, the user can delete a selected refine operation 515. The user can see each criterion 316 that makes up a refine operation 515 by clicking the "+" node icon 510b next to the name of the refine operation. A "+" node 510b indicates a further level of criteria below the node. A "–" node 510a indicates no further level of criteria below the node. The operation of these other two tabs is further described below.

Defining Refine Operations

Figure 6:
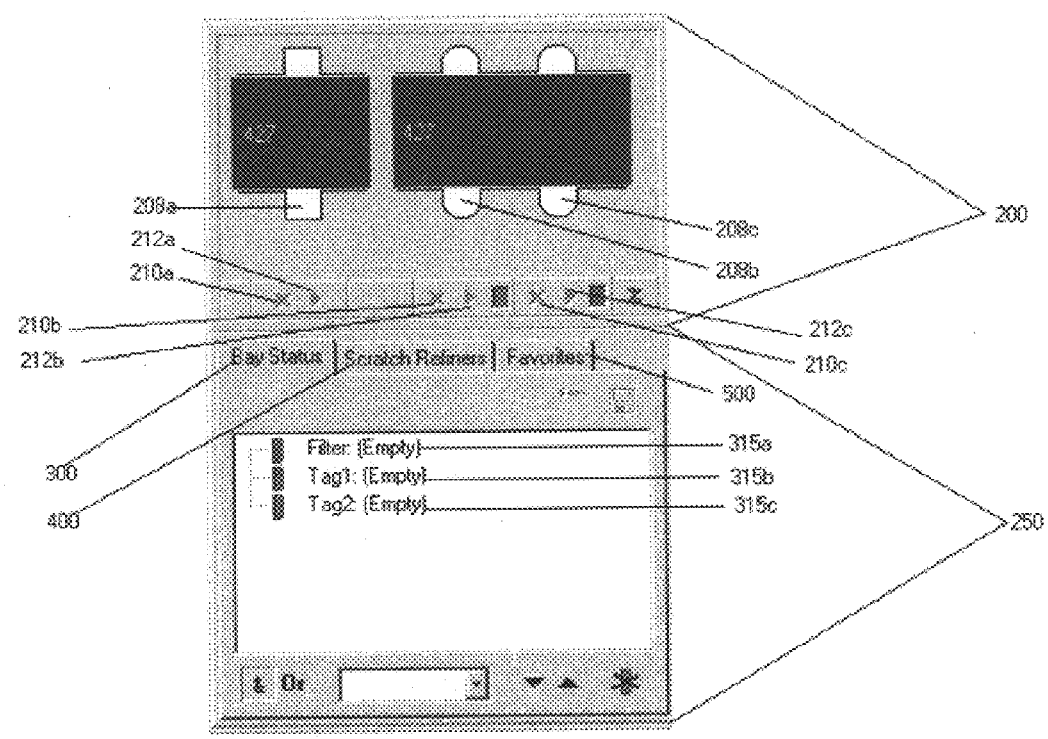
FIG. 6 is an illustration of the query construction area and Bay Status tab prior to definition of a refine operation showing empty icon bays.

Referring now to FIG. 6, there is shown the query construction area 200 prior to the definition and application of a refine operation. The query construction area 200 graphically represents that there are 427 items in the database 106 representing a first plurality of items prior to a filter operation being executed. All icon bays 208 are empty, and thus, the cancel control buttons 210a, 210b, and 210c and run control buttons 212a, 212b, and 212c for each icon bay 208 are disabled. The Bay Status tab 300 also indicates that each of the icon bays 208a, 208b, and 208c is empty 315a, 315b, and 315c. Displayed in the query construction area 200 is a stream graphically representing all items in the database 106 being used, with the quantity value indicating the number of items, here 427 items.

The user may now define and apply any variety of refine operations, including filter and tag operations, to the records or items stored in the database 106. The present invention provides a number of different mechanisms for defining and applying refine operations.

Defining a New Refine Operation Using the Scratch Refiners Tab

Figure 7:
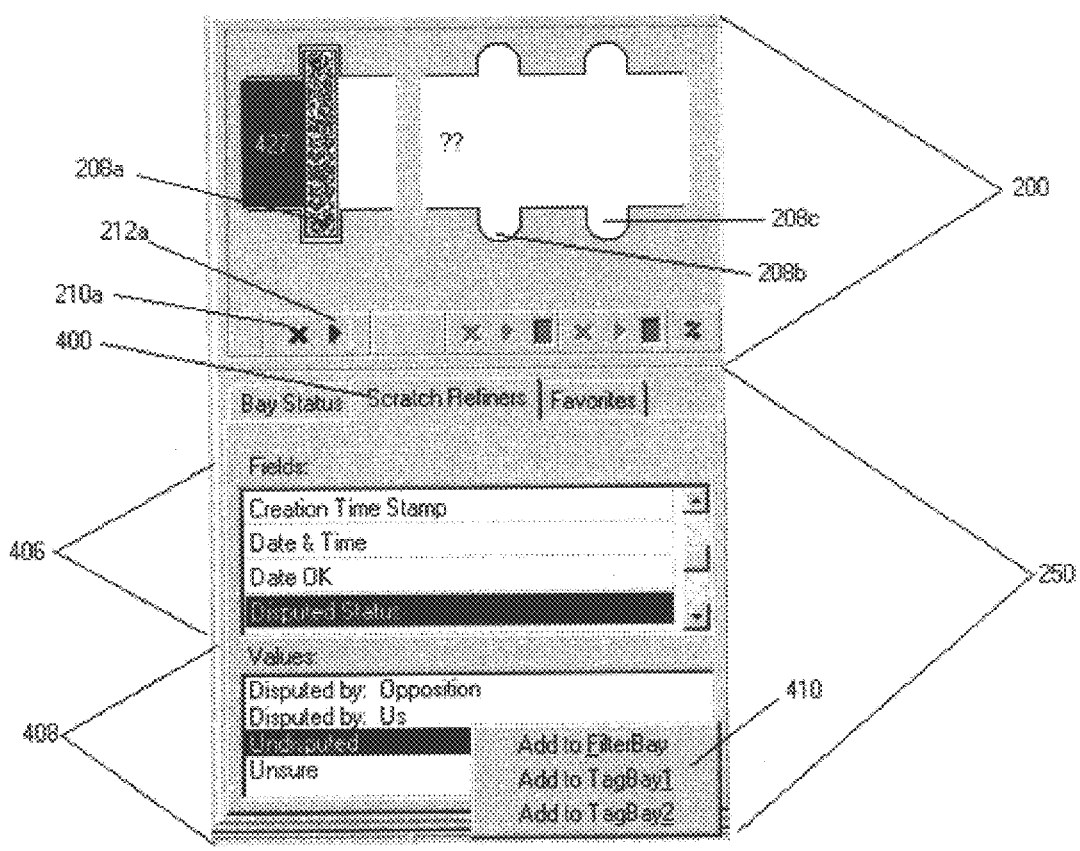
FIG. 7 is an illustration of the query construction area and Scratch Refiners tab depicting the creation of a refine operation using the Scratch Refiners tab.

FIG. 7 illustrates the Scratch Refiners tab 400 that includes a Fields list 406 and a Values list 408 for defining the particular criterion of a refine operation. The Field list 406 specifies all fields available in the database 106 that can be used to make up a criterion. Any of the listed fields may be selected by the user. The Values list 408 is responsive to the selected field in the Fields list, and in response thereto, displays the unique values for the field using a predefined ordering. The list format allows for very rapid definition of the criterion for a refine operation using a mouse or other pointing device. The method for defining a new refine operation is through direct manipulation of criteria.

To define the refine operation then, the user first selects one of the fields from the Fields list 406, and then selects one of the values for that field in the Values list 408. Once selected in this manner, the refine operation may be instantiated as either a filter operation or a tag operation, depending on where it is placed in the query construction area 200. The user moves the selected criterion into the query construction area 200 using one of two methods: (1) using a drag-and-drop implementation by dragging the selected value from the Values list 408 with the mouse or other pointing device to an icon bay 208, and releasing the mouse at that location, or (2) an alternative method, wherein the user right-clicks the mouse to employ the shortcut menu 410, and selecting one of the listed icon bays 208. The drag-and-drop methodology is made available through Microsoft Corp.'s Windows95 application programming interface. In either cases, the Data Refinery 108 automatically generates the appropriate icon 206 corresponding the target icon bay 208, and instantiates the corresponding refine (filter or tag) operation with the selected field and value. Each refine operation has at least one criterion, including a field, a operator or qualifier, and a value. In the resulting refine operation, the field is the entity or attribute selected from the Fields list 406, the operator is by default "=," and the value is the value selected in the Values list 408. The refine operation uses a default equals operator, since it is assumed that the user intends to refine based on items that have a field value equal to the selected field and value.

Dragging the selected refine or criterion to the Filter Bay 208a defines a filter operation and causes the query construction area 200 to instantiate a filter icon 206a in the Filter Bay 208a. In like manner, dragging the selected refine operation or criterion to a Tag Bay 208b or 208c defines a tag operation and causes the query construction area 200 to instantiate a tag icon 206b or 206c. In FIG. 7, the user has selected the "Undisputed" item in the Values list 408 and placed it in the Filter Bay 208a. Because the filter operation has not yet been executed, there is no output stream shown, and "??" is used to indicate that an unknown quantity of items would be identified by the operation. The result of dragging this test criterion to an icon bay 208a, 208b, or 208c and executing the operation will be demonstrated later. Because the refine operation has not yet been executed, the run button 212a for filter operation is enabled. The cancel button 210a for filter operation is also enabled allowing the user to cancel the refine operation in the Filter Bay 208a.

Applying Additional Criterion to an Existing Refine Operation

In the preferred embodiment, refine operations can include as many criteria as the user wants. While the majority of the refine operations that the user creates will probably be made of a single criterion, there is no limit to the number of criteria that the user can combine in one refine operation. To define multiple criteria, the user selects multiple values in the Values list 408; multiple criteria defined in this manner are processed as conjuncts or disjuncts.

Figure 8:
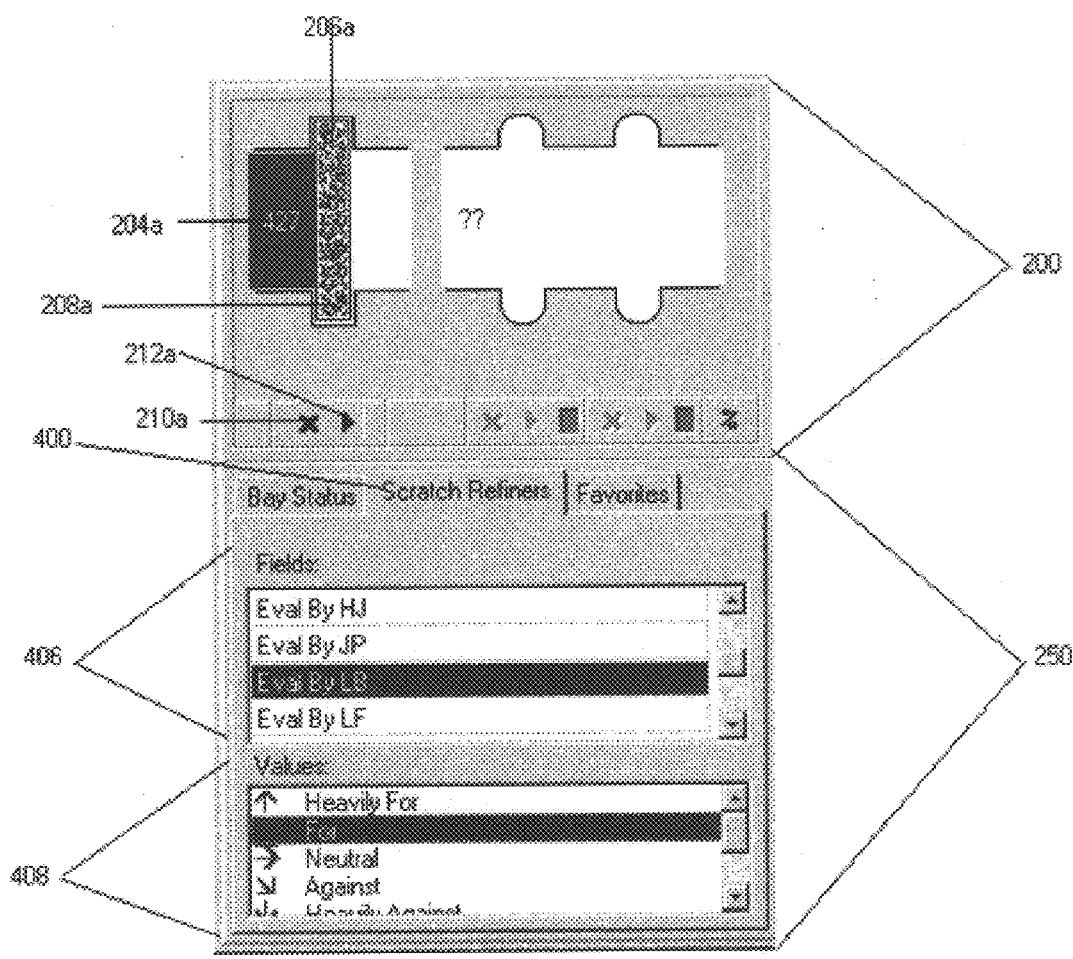
FIG. 8 is an illustration of the query construction area and Scratch Refiners tab depicting the addition of a criterion to an existing refine operation.

FIG. 8, pursuant to FIG. 7, illustrates the user interface of the Data Refinery 108, graphically representing a first plurality of items 204a prior to executing a filter operation. Because the filter operation has not yet been executed, there is no output stream shown, and "??" is used to indicate that an unknown quantity of items would be identified by the operation. The icon bay 208, here Filter Bay 208a, has received a filter icon 206a representing one filter operation as exemplified in FIG. 7, the filter icon 206a representing the value "Undisputed" for the field "Disputed Status."

Figure 9:
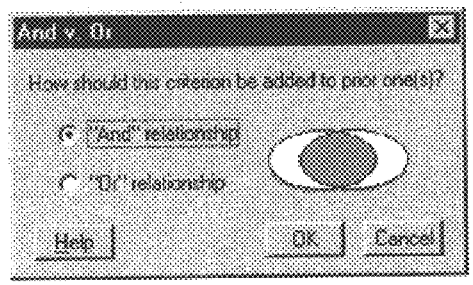
FIG. 9 is an illustration of the dialog box for defining the logical relationship between multiple criteria.
Figure 10:
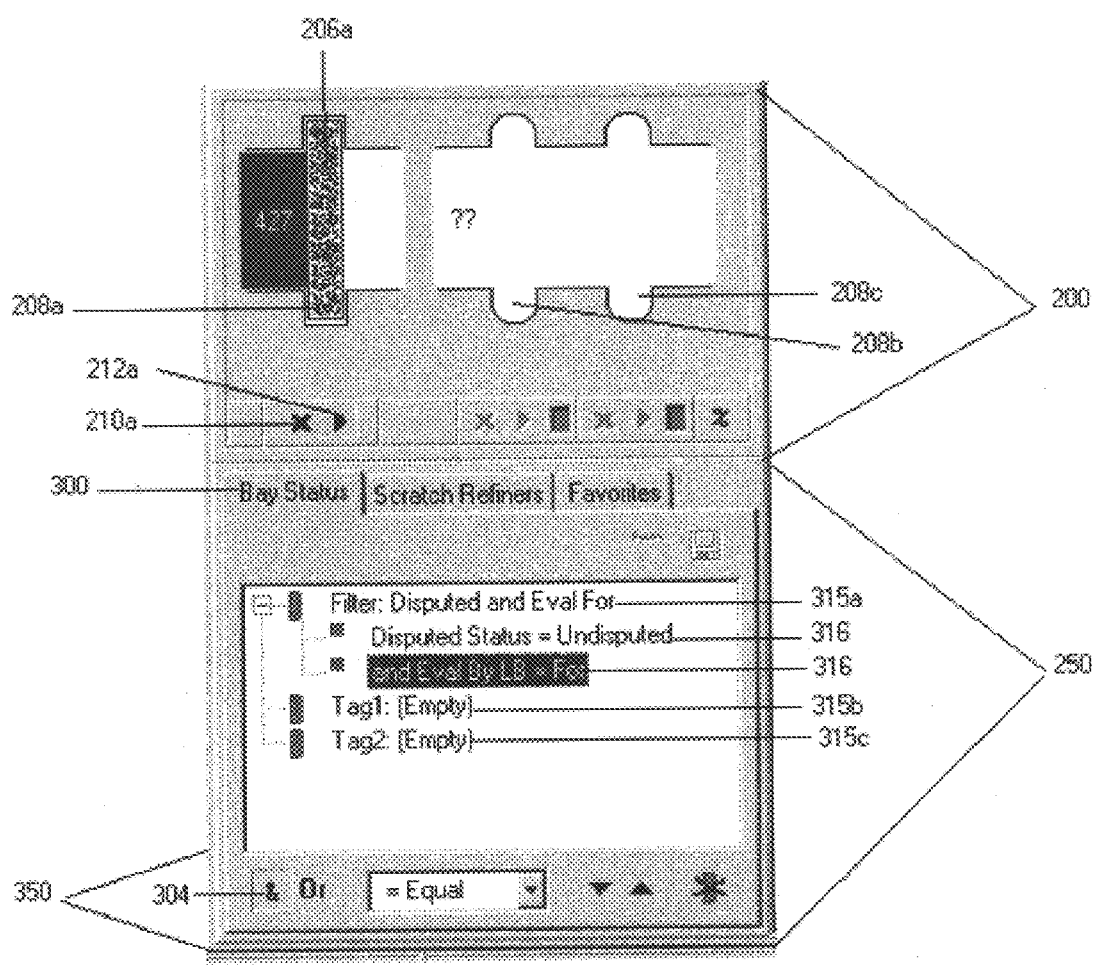
FIG. 10 is an illustration of the query construction area and Bay Status tab prior to running a filter operation showing the status of the Filter Bay with multiple criteria.

The user may now add another criterion to an existing refine operation that has its icon 206 in one of the icon bays 208. One method for doing this is through using the same drag-and-drop methodology used to create a new refine operation. Again, on the Scratch Refiners tab 400, the user selects a field from the Fields list 406 and a value from the Values list 408, and then drags the selected value to the desired icon bay 208a, 208b, or 208c which already contains refine icon 206a, 206b, or 206c, respectively. A message box is then displayed, as shown in FIG. 9, asking the user to select how this new criterion should be added to the prior ones–whether the new criterion should be applied as "and" or "or." Adding the criterion with an "and" relationship makes it a conjunct of the existing criteria of the refine operation; adding the criterion with an "or" relationship makes it a disjunct of the existing criteria of the refine operation. In FIG. 8, the user has selected the "For" item in the Values list 408. FIG. 10 is an illustration of the query construction area 200 and Bay Status tab 300 prior to running a filter operation showing the status of the Filter Bay 208a with multiple criteria. The criteria 316 are shown to have been joined in conjunctive relationship as highlighted by the second criterion 316 "and Eval By LB =For" found under the status 315a of the Filter Bay 208a.

Referring again to FIG. 2, a user may also drag a refine operation from the Favorites tab 500, one of the three Refiner Control tabs 250, and drop it onto an existing refine icon 206a, 206b, or 206c in an icon bay 208a, 208b, or 208c. The user is presented with a dialog box, as in FIG. 9, asking whether the new criterion or test should be added as a conjunct or as a disjunct.

Once a refine operation is applied to one of the icon bays 208, it may be executed by clicking on the corresponding run button 212a, 212b, or 212c, or canceled by clicking on the corresponding cancel button 210a, 210b, or 210c.

Modifying a Refine Operation

Figure 11:
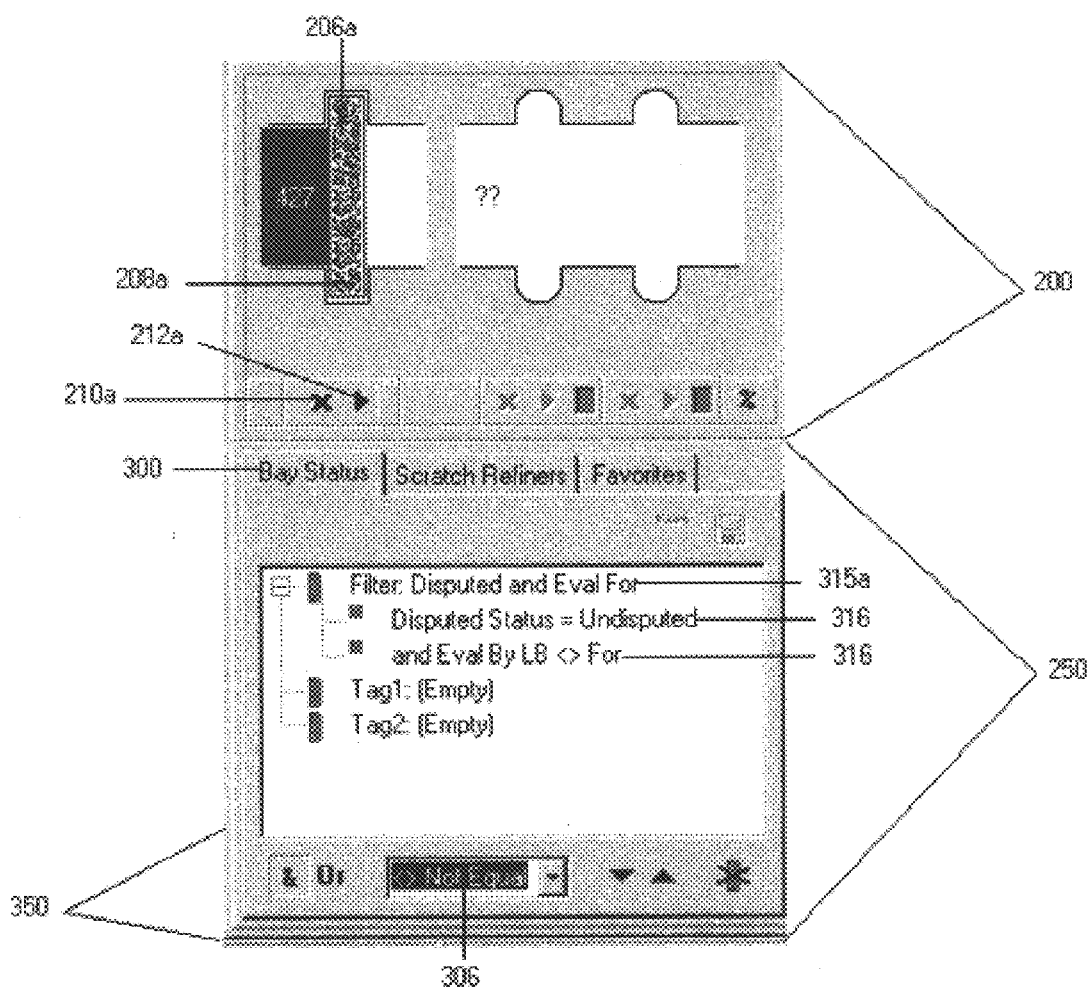
FIG. 11 is an illustration of the Criterion Edit Panel on the Bay Status tab following modification of a criterion for a refine operation.

Once an icon 206 appears in an icon bay 208, the user may edit any of the criteria defined for the refine operation, using the options on the Criterion Edit Panel 350 at the bottom of the Bay Status tab 300, for example, to change any of the logical relationships, the operators, the order of the criteria, or to delete the criterion. FIG. 11 is an illustration of the Criterion Edit Panel 350 on the Bay Status tab 300 following modification of a criterion 316 that makes up a refine operation "Filter: Undisputed and Eval For". In this example, the initial operator defining the test operation was changed from "=" (see FIG. 10) to "<>", i.e., all values except "For."

Applying an Existing Refine Operation

Figure 12:
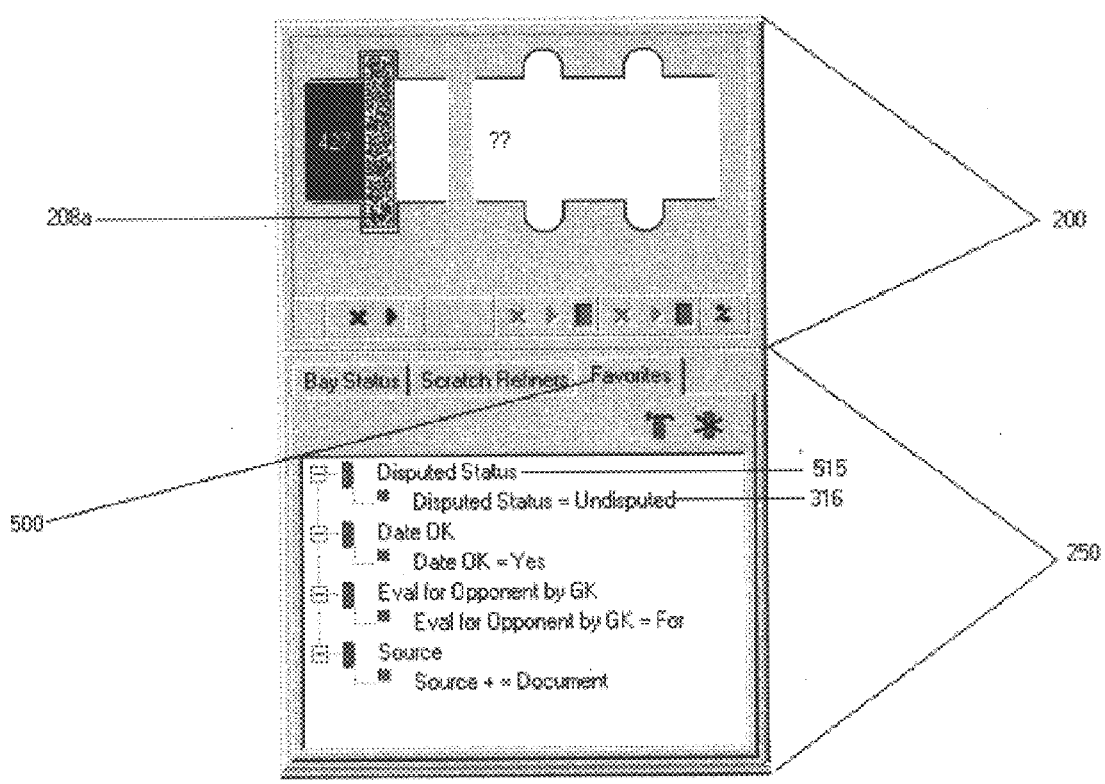
FIG. 12 is an illustration of the query construction area and the Favorites tab depicting the creation of a refine operation using the Favorites tab.

Referencing FIG. 12, the user can apply a stored refine operation from the Favorites tab 500, one of the Refiner Control tabs 250, to the query construction area 200 by a drag-and-drop operation, which is made available through Microsoft Corp.'s Windows95 application programming interface. More particularly, the user selects a refine operation that has been saved and is listed in the Favorites tab 500, and drags it using a mouse or other pointing device to one of the icon bays 208a, 208b, or 208c in the query construction region 200. The refine operation then becomes either a filter operation or a tag operation depending upon whether the refine operation is placed into either a Filter Bay 208a or a Tag Bay 208b or 208c. FIG. 12 is an illustration of instantiating a refine operation using the Favorites tab 500. The user has selected a refine operation 515 in the Favorites tab 500 that was previously created and saved, and which is shown to be made up of one criterion 316: "Disputed Status=Undisputed". The user has dragged the refine operation 515 to the Filter Bay 208a, but has not yet executed the refine operation.

Executing a Refine Operation as a Filter Operation

Figure 13:
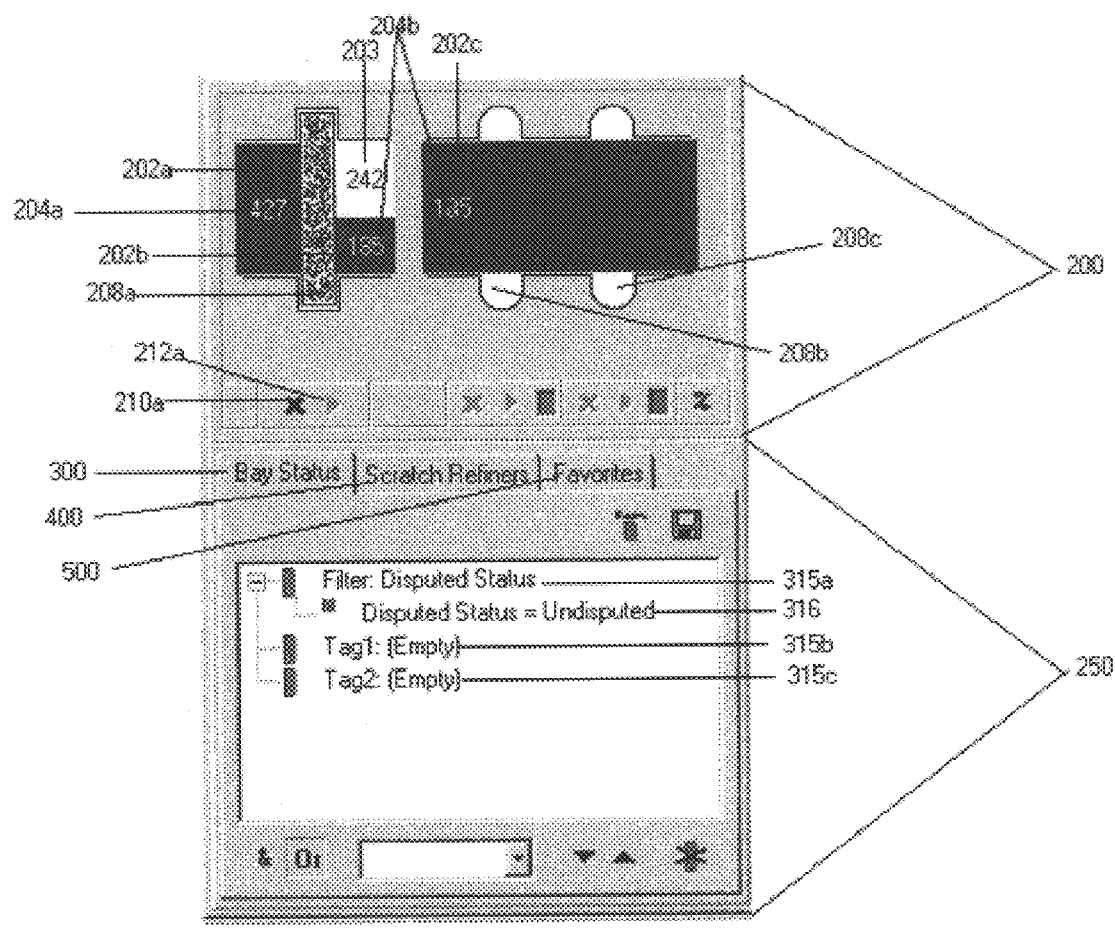
FIG. 13 is an illustration of the query construction area following execution of a filter operation.

FIG. 13 illustrates the user interface of the Data Refinery 108 following execution of a filter operation. The query construction area 200 includes one filter icon bay 208a into which the user has placed a refine operation, represented by its own icon 206a. The Bay Status tab 300 of the Refiner Control tabs 250 reflects that the Filter Bay 208a includes a defined refine operation, which is named "Disputed Status," and includes one criterion 316, which is that an item in the database 106 must have a disputed status of "Undisputed." The Bay Status tab 300 also reflects that Tag Bay 1 (208b) and Tag Bay 2 (208c) have a status 315 of "Empty."

FIG. 13 illustrates the result of dragging the refine operation to the Filter Bay 208a, and executing the refine operation. To execute the refine operation, the user has dragged the selected criterion from the Scratch Refiners tab 400 or from the Favorites tab 500 to the Filter Bay 208a, as described above. Then, the user clicked the run button 212a for the filter operation. The refine operation is translated into an appropriate query to the database 106, for example, an SQL Select statement, using the field, values, operators, and logical relationships defined in the criterion of the refine operation.

In FIG. 13, the filter operation has been executed, so that the run button 212a is disabled and the cancel button 210a is available. The input stream 202a shows that 427 items from the database 106 are included as the input set, this being the quantity value 204a of the first plurality of items prior to a filter operation 204a. The output stream 202b shows that 185 items were selected by the filter operation, this being the quantity value 204b of the second plurality of records. Also included in the query construction area 200 is the graphical representation that 242 items were not selected by the filter operation 203. As before, the ratio of the graphical size of the tagged output stream 202b to the graphical size of the input stream 202a is approximately equal to the ratio of the quantity of the items in the tagged output stream to the quantity of items in the input stream.

This constraint on sizing is maintained for any subsequent tag operation also, with the ratio of the graphical size of the output stream of the subsequent tag operation to the graphical size of the tag input stream 202c approximating the ratio of the quantity of items in the later output stream to the quantity of items in the tag input stream 202c. Running a filter operation thus displays the retrieved subset of records to the user.

The graphical sizing constraint for input and output streams is determined as follows. Given that the horizontal width of all output streams of a refine operation is the same, only the vertical height need be adjusted. Accordingly, the vertical height, in number of pixels, for an output stream may be determined as:

$$\text{Pixel Height} = \text{Total Pixel Height} * (\text{Stream Output Quantity}/\text{Stream Input Quantity})$$

Where, Total Pixel Height is the total number pixels between the top and bottom of the query construction area 200 to be filled, Stream Output Quantity is the quantity of items selected by the refine operation, and Stream Input Quantity is the quantity of items input into the refine operation. The pixel height is rounded off to the nearest pixel. The pixel height is then used as an offset between the bottom of the output stream and the top of the output stream.

Figure 14A:
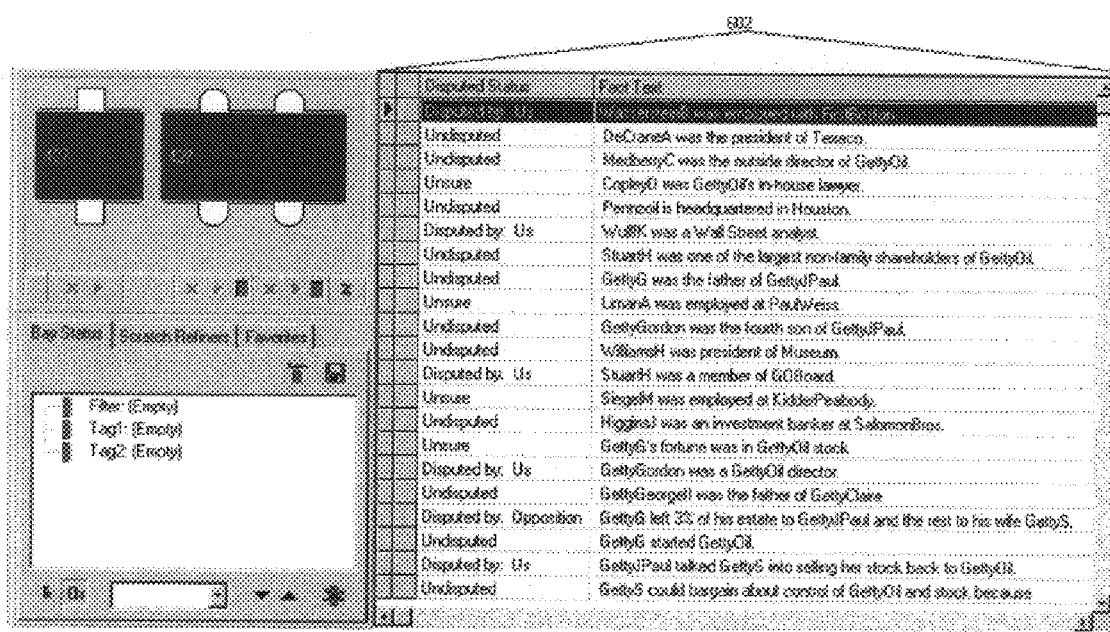
FIG. 14a is an illustration of a database table prior to executing a filter operation.

FIG. 14a is an illustration of a database table 602 prior to a filter operation. The database table 602 lists records in the database 106. The query construction area 200 shows that there are no refine operations present or executed.

Figure 14B:
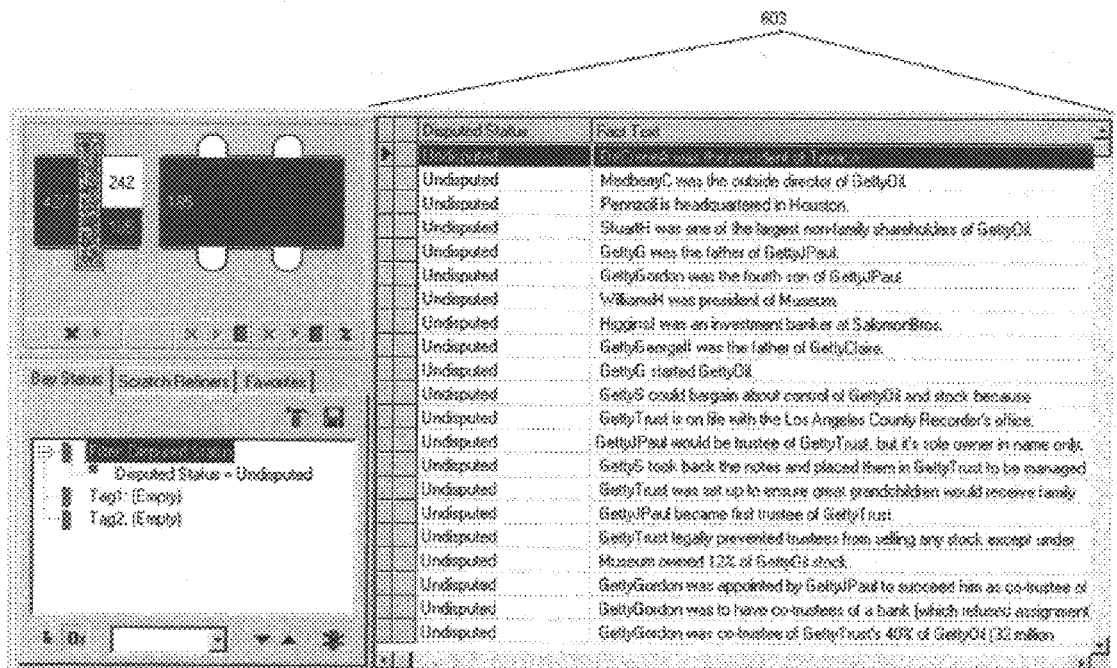
FIG. 14b is an illustration of the aforementioned database table following execution of a filter operation.

FIG. 14b is an illustration of the same table following execution of a filter operation in the query construction area 200, showing the results of the filter operation. The filter operation is the one previously described, with a single criterion of "Disputed Status =Undisputed." The database table 603 now displays only those records or items where the field "Disputed Status" has a value of "Undisputed." All other records or items of database table 602 (FIG. 14a) were blocked by the filter and consequently do not display in the database table 603.

Executing a Refine Operation as a Tag Operation

Figure 15A:
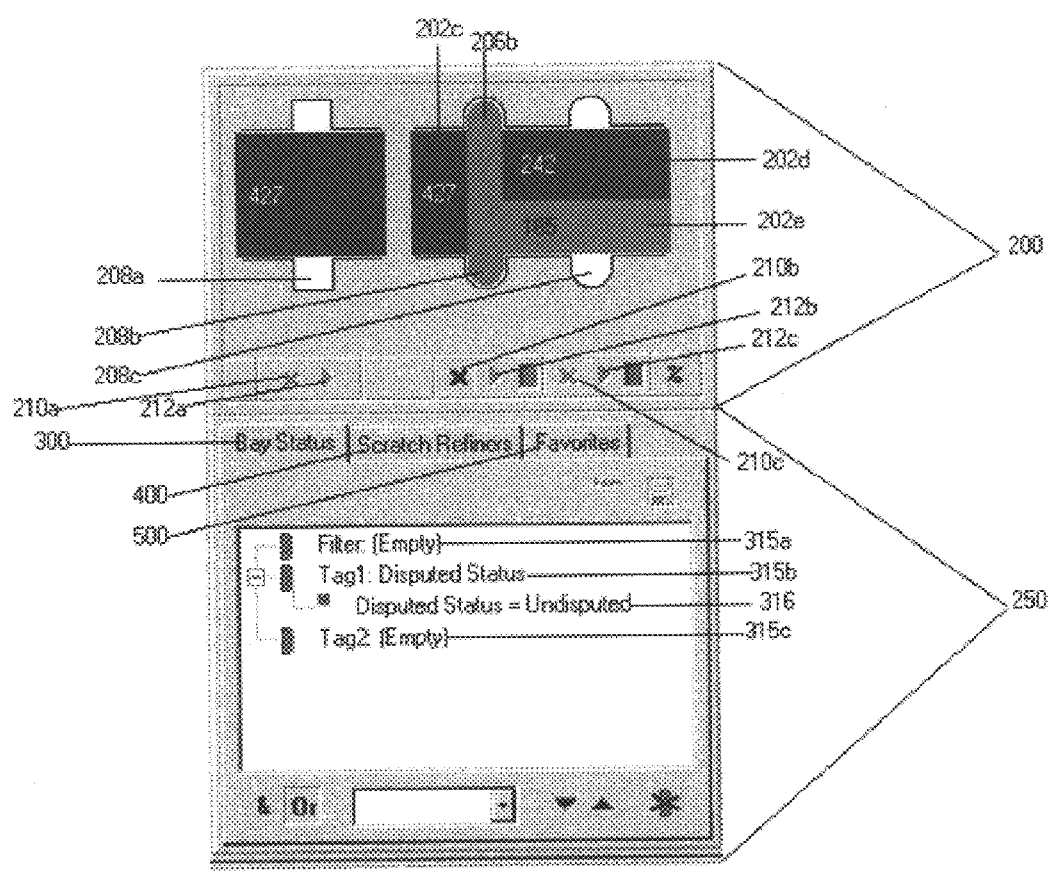
FIG. 15a is an illustration of the query construction area following execution of a tag operation from Tag Bay 1.

Dragging the same refine operation to one of the Tag Bays 208b, 208c instead of the Filter Bay 208a defines a tag operation and causes the query construction area 200 to instantiate a tag icon 206. FIG. 15a illustrates the user interface of the Data Refinery 108 as a result of dragging the same refine operation to Tag Bay 1 (208b), and executing the refine operation. The Bay Status tab 300 shows that the Filter Bay 208a is empty and that Tag Bay 2 (208c) is empty. The Bay Status tab 300 also shows that Tag Bay 1 (208b) includes an icon 206 for a refine operation named "Disputed Status" with one criterion 316 defined for the operation. Following execution of the tag operation, all items in the database with a field "Disputed Status" and value of "Undisputed" will be visually distinguished in the output stream from nonmatching items.

To execute the refine operation, the user first drags the selected criterion from the Scratch Refiners tab 400 or from the Favorites tab 500 to Tag Bay 1 (208b). Then, the user clicks the run button 212b for tag operation. In FIG. 15a, the tag operation has been executed, so that the run button 212b is disabled and the cancel button 210b is available. The input stream 202c shows that 427 items are included as the input set. The output stream includes a tagged output stream 202e and an untagged output stream 202d. As before, the ratio of the graphical size of the tagged output stream 202e to the graphical size of input stream 202c is approximately equal to the ratio of the quantity of the items in tagged output stream 202e to the quantity of items in the input stream 202c. The ratio of the graphical size of the untagged output stream 202d to the graphical size of input stream 202c is approximately equal to the ratio of the quantity of items in the untagged output stream 202d (i.e., those items not satisfying the criterion of the tag operation) to the quantity of items in the input stream 202c. Thus, the output stream of the tag operation displays both the original set of records and the retrieved subset, but the retrieved subset is visually distinguished within the context of the larger set of records.

In FIG. 15a then, the input stream 202c is a first area graphically representing the first plurality of items prior to a tag operation, output stream 202e is a second area graphically representing a second plurality of items selected by the tag operation, the second area graphically sized in approximate proportion to the first area, as is a ratio of the second plurality of items to the first plurality of items.

Figure 15B:
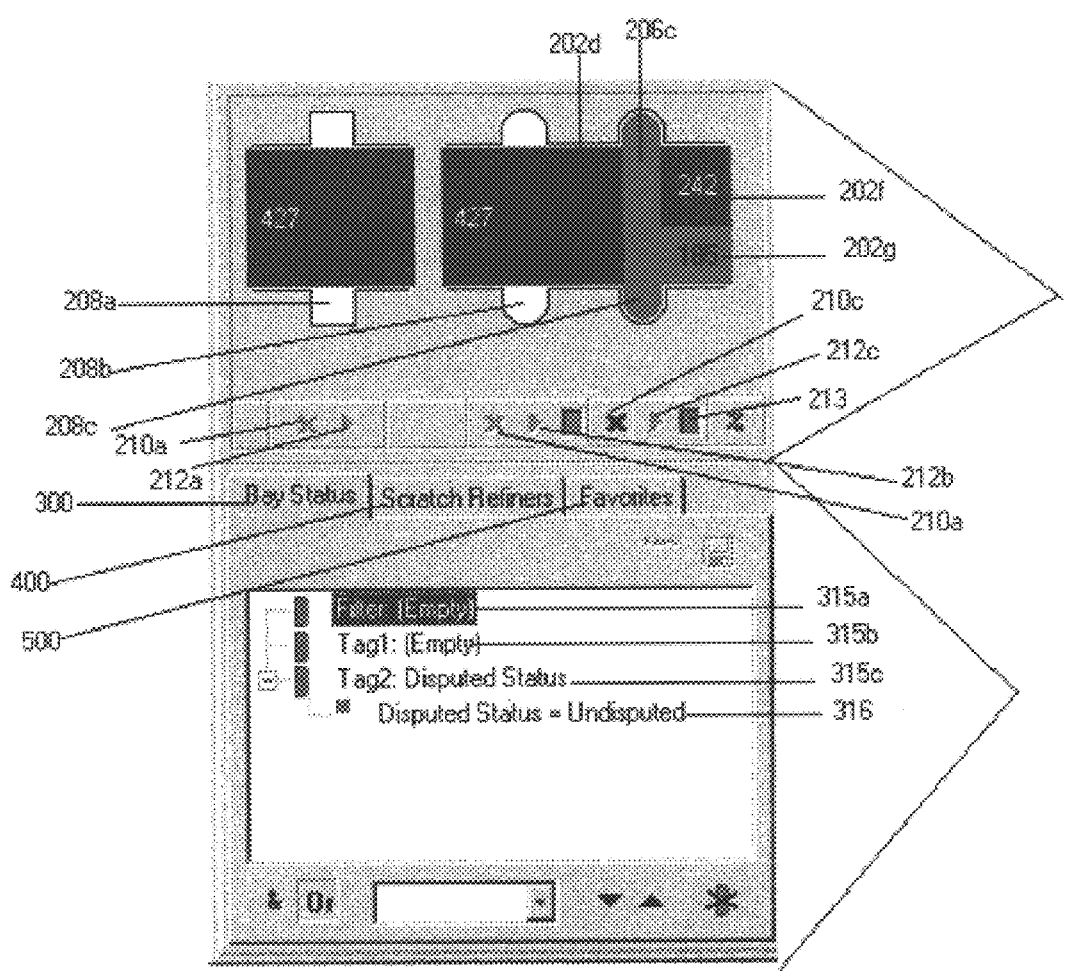
FIG. 15b is an illustration of the query construction area following execution of a tag operation from Tag Bay 2.

In FIG. 15b, dragging the same refine operation to the other tag bay, Tag Bay 2 (208c) also defines a tag operation and causes the query construction area 200 to instantiate a tag icon 206c. FIG. 15b illustrates the user interface of the Data Refinery 108 as a result of dragging the same refine operation as above to Tag Bay 2 (208c), and executing the refine operation. The Bay Status tab 300 of the Refiner Control tabs 250 shows that the Filter Bay 208a is empty and that Tag Bay 1 (208b) is empty. The Bay Status tab 300 also shows that Tag Bay 2 (208c) includes an icon for a refine operation named "Disputed Status" with one criterion 316 defined for the operation. Following execution of the tag operation, all items in the database with a disputed status of "Undisputed" will be marked with a tag icon corresponding to the color that the user selected in the Tag Bay 2 color box 213. Following execution of the refine operation, the untagged output stream 202d shows that 427 items are included as the input set. The output stream from Tag Bay 2 includes a tagged output stream 202g by the second operation and an untagged output stream 202f. As before, the ratio of the graphical size of the tagged output stream 202g to the graphical size of input stream 202d is approximately equal to the ratio of the quantity of the items in tagged output stream 202g to the quantity of items in the input stream 202d. The ratio of the graphical size of the untagged output stream 202f to the graphical size of input stream 202d is approximately equal to the ratio of the quantity of items in the untagged output stream 202f (i.e., those items not satisfying the criterion or test of the tag operation) to the quantity of items in the input stream 202d.

Figure 16A:
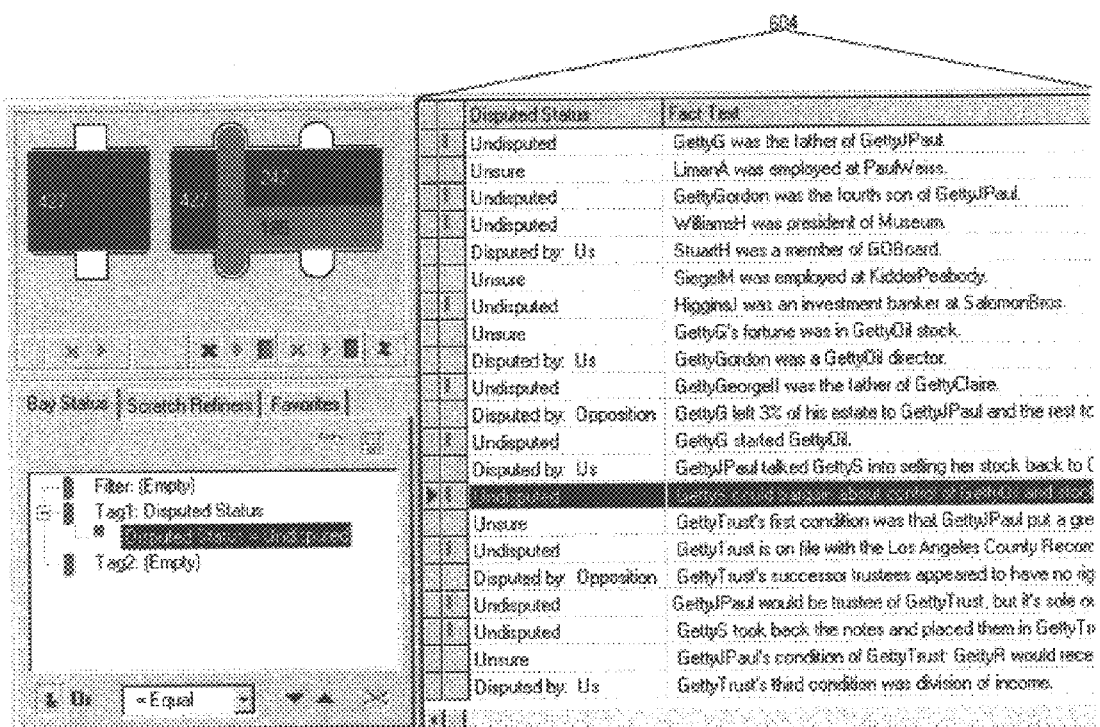
FIG. 16a is an illustration of a database table displaying the results of one tag operation.

The results of a tag operation can be reviewed in detail in a database table window, such as illustrated in FIG. 16a. Table 604 is a table of the database 106 that contains the entity upon which the tag operation was executed. Each row of the table 604 is a record of the database 106, and the columns correspond to the entity's fields. Those records that satisfy the tag operation and match the criterion defined therein are "tagged" or visually distinguished in the table 604 of the database. In the illustrated embodiment, tagging is indicated by displaying a small distinctive tagged icon 606 in the special column 600 that appears as the first field in the table 604. In this manner, the user is able to immediately see the results of the tag operation on the database, while preserving the context of the overall set of data.

Figure 16B:
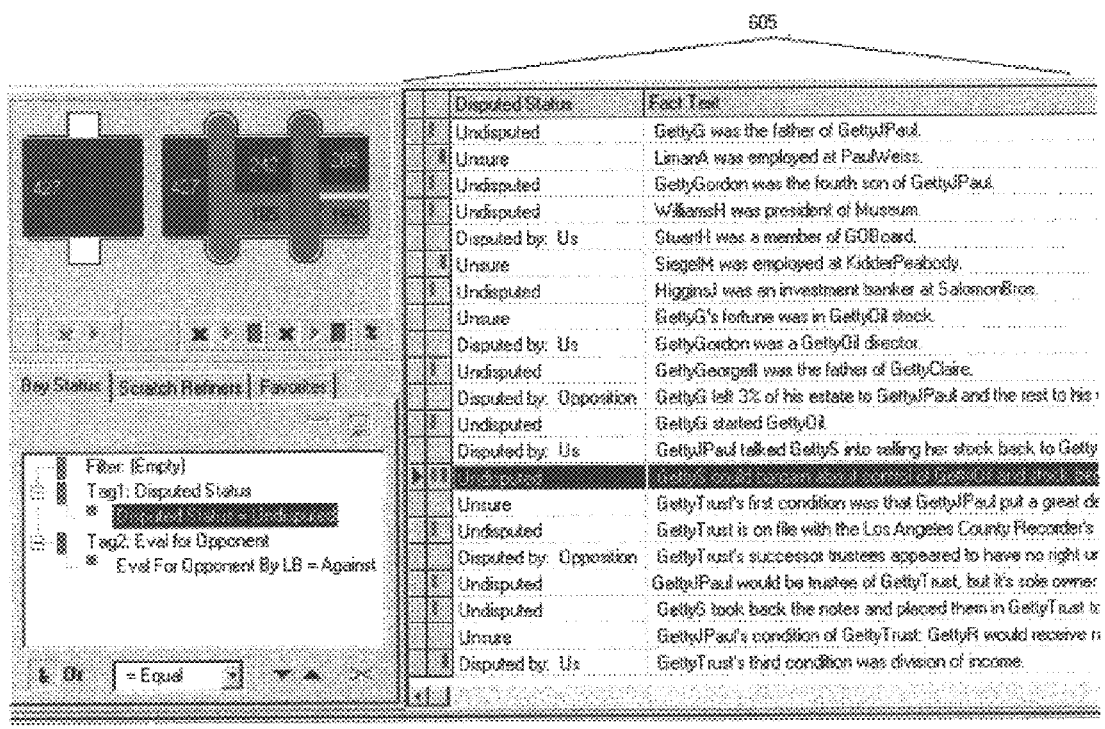
FIG. 16b is an illustration of a database table displaying the results of two tag operations.

The results of executing two tag operations can likewise be reviewed in detail in a table window, such as illustrated in FIG. 16b. Table 605 is a table of the database 106 that contains the entity upon which two tag operations were executed. Those records that satisfy the first tag operation and match the criterion defined therein are "tagged" or visually distinguished in the table 605 with a first distinctive tagged icon 606. Those records that satisfy the second tag operation and match the criterion defined therein are "tagged" or visually distinguished in the table 605 with a second distinctive icon 607. In the illustrated embodiment, some records are marked with the colored tagged icon 606 matching the color (green) of the first tag operation and some records are marked with the colored tagged icon 607 matching the color (red) of the second tag operation. Other visual distinguishing features may be used, such as different fonts, other icons, or the like. One record, which is selected in FIG. 16b, is marked with two tagged icons, and thus satisfies both tag operations. Having the results of two or more separate tag operations be concurrently present in the table 605 and yet visually distinguished, enables the user to easily select and examine individual records matching any of the tag operations, and yet at the same time, understand the context of the larger set of records which did not satisfy either refine operation. The user may examine such other records to understand what factors led to their not being tagged. Executing multiple operations is explained in greater detail below.

Executing Multiple Operations

Figure 17:
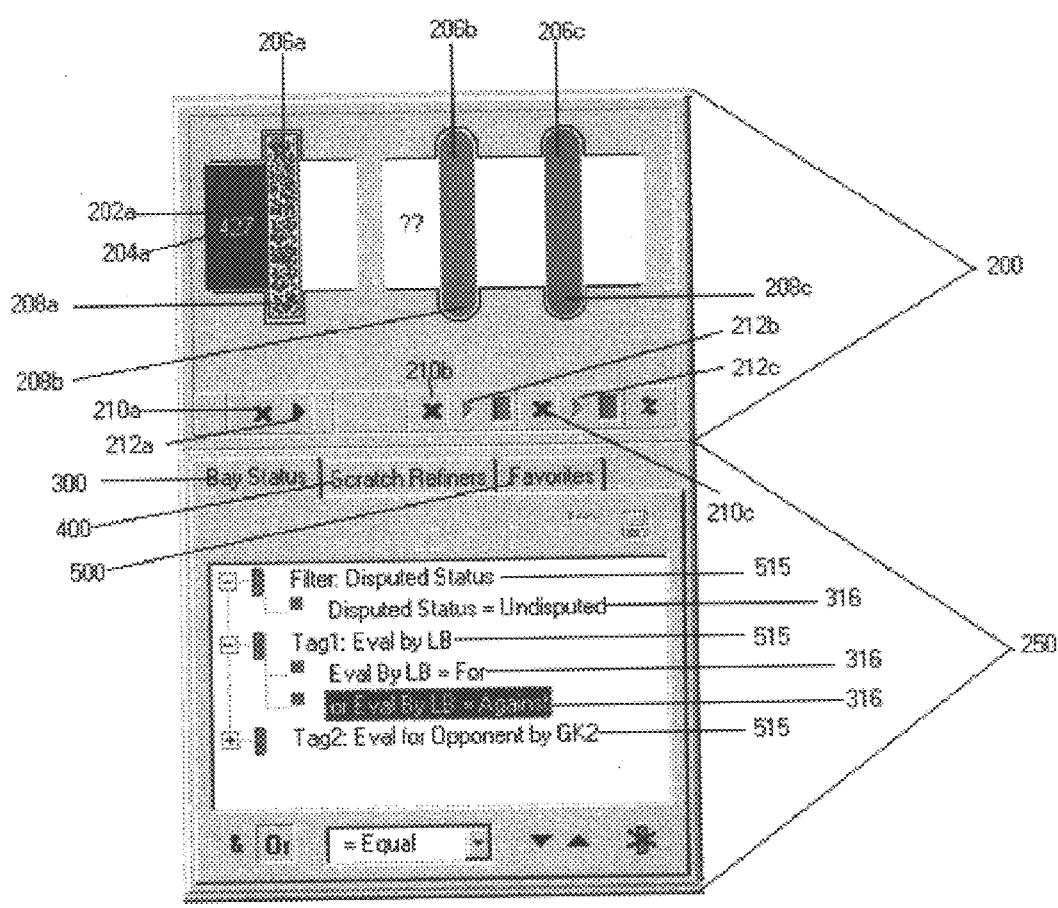
FIG. 17 is an illustration of the query construction area following definition of serial filter, first tag, and second tag operations.

The present invention supports multiple, concurrent filter and tag operations. FIGS. 17, 18, 19, and 20 illustrate definition, application, and execution of a filter operation followed by two tag operations. FIG. 17 illustrates the definition of one filter operation and two tag operations, none of which have been executed. The Filter Bay 208a contains a filter icon 206a. Tag Bay 1 (208b) contains a tag icon (206b) Tag Bay 2 (208c) contains a tag icon (206c). The run button 212a for filter operation is available; whereas the run control buttons 212b and 212c for each tag bay are disabled. All three cancel buttons 210a, 210b, and 210c are available for the user to cancel the corresponding refine operation. The Bay Status tab 300 of the Refiner Control tabs 250 displays the name of each refine operation 515 and all criterion 316 that make up each refine operation 515. As exemplified in FIG. 17, the refine operation "Filter: Disputed Status" 515 contains one criterion 316: "Disputed Status= Undisputed." The refine operation "Tag 1: Eval by LB" 515 contains two criteria 316: (1) "Eval by LB =For" disjoined with (2) "Eval By LB=Against". The levels of the Tag Bay 2 refine operation have not been revealed since the user did not select the "+" icon.

Figure 18:
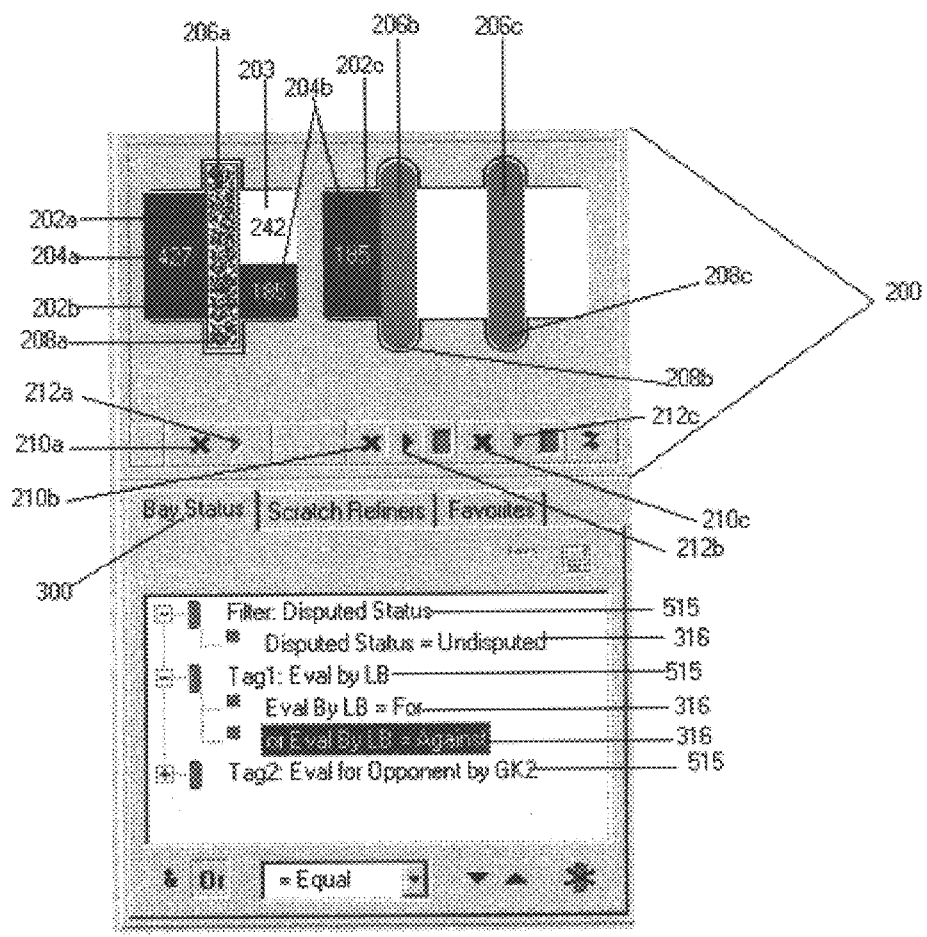
FIG. 18 is an illustration of the query construction area following execution of a filter operation, prior to executing first, and second tag operations.

FIG. 18 illustrates the results of execution of the filter operation and prior to execution of the two tag operations. Again, the relative sizing the input and output streams is apparent, as explained above. In the illustrated embodiment, there is a graphical separation between the output stream of the filter icon 206a and the input stream of the first tag icon 206b. This physical separation is not essential, and where multiple operations are processed, it is preferred that the output stream from one refine operation directly becomes the input stream to the next refine operation, as shown with the two tag operations in FIG. 2 with the output stream of Tag Bay 1 forming the input stream to Tag Bay 2.

Figure 19:
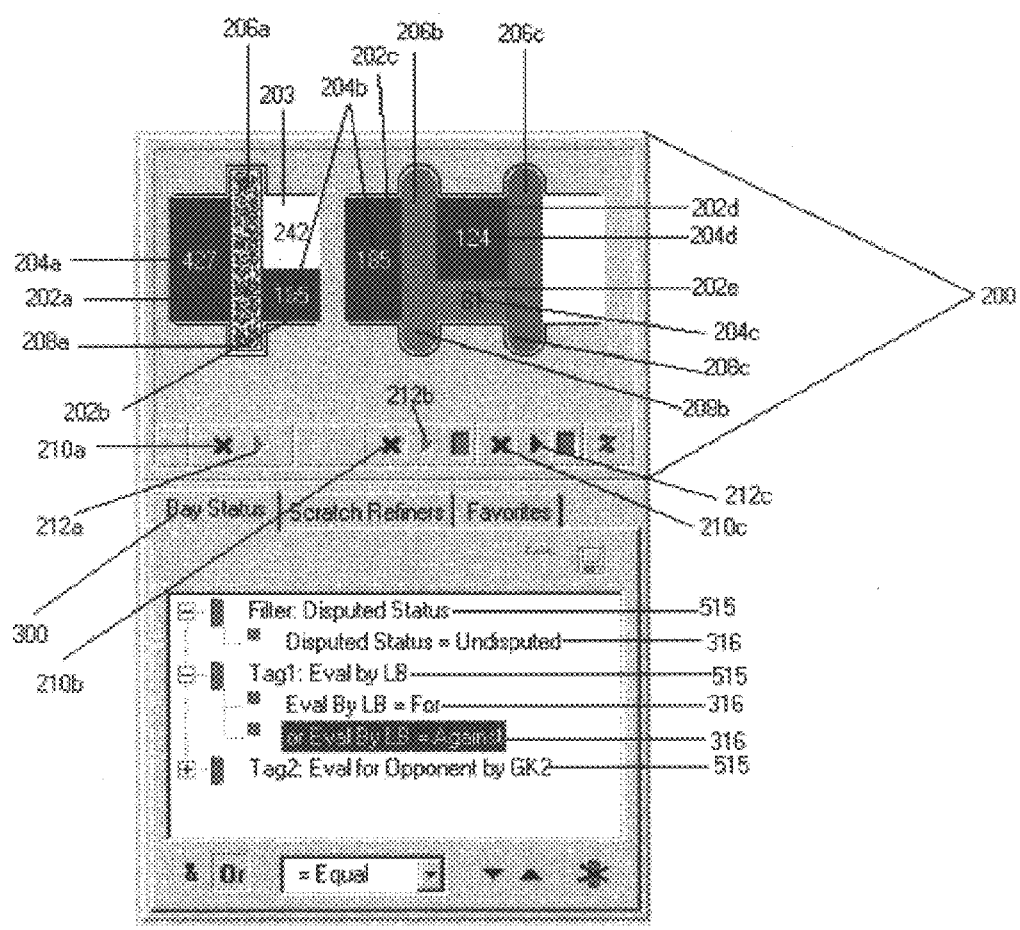
FIG. 19 is an illustration of the query construction area following execution of a serial filter and the first tag operation, prior to executing the second tag operation.

FIG. 19 illustrates the query construction area 200 following execution of the filter operation and execution of the first tag operation, but prior to execution of the second tag operation. Here, the output streams 202d and 202e from the first tag operation are sized relative to the input stream 204b, and thus reflect the tagging of only those records which were initially selected by the filter operation in Filter Bay 1. FIG. 19, thus illustrates a graphical method of identifying data in a database of items, by displaying a first filter area having a first area as the input stream 202a for graphically representing a first plurality of items prior to a first filter operation; a second area as the output stream 202b for graphically representing a second plurality of items resulting from the first filter operation, the second plurality of items being a subset of the first plurality of items, and a filter icon bay 208a for graphically representing a filter icon 206 representing the first filter operation, the icon bay 208a displayed between the first and second areas. The method also displays a first tagging area simultaneously with the first filter area, the first tagging area having a third area, as input stream 202b, for graphically representing the second plurality of items prior to a first tag operation, a fourth area, as output stream 202d for graphically representing a third plurality of items resulting from the first tag operation, the third plurality of items being a subset of the second plurality of items, and a first tag icon bay 208b for graphically representing a first tag icon 206b representing the first tag operation, the first tag icon bay 208b displayed between the third and fourth areas.

Figure 20:
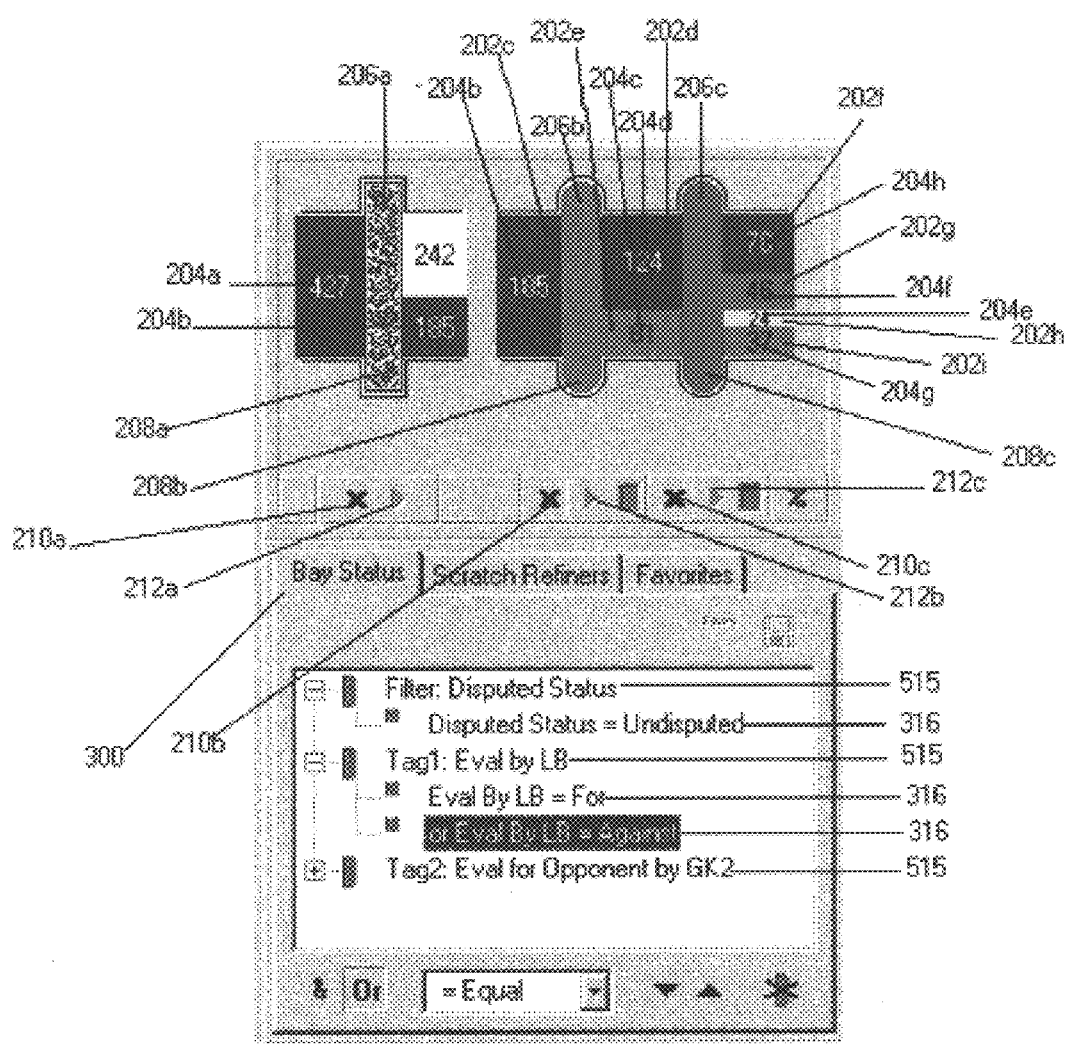
FIG. 20 is an illustration of the query construction area following multiple, serial operations.

FIG. 20 illustrates the query construction area 200 following execution of the serial tag operations, following execution of the filter operation. The query construction area 200 includes two icon bays: Tag Bay 1 (208b) and Tag Bay 2 (208c) into which the user has placed two different refine operations, each represented by its own tag icon 206b and 206c respectively. Being in the Tag Bays, the database management system 104 has executed these as tag operations. The input stream 202c to the first tag operation is a large quantity (204a) of records from the database 106. The output stream 202d and 202e from the first tag icon 206b becomes the input stream for the second tag icon 206c. Application of the second tag operation yields output streams 202f, 202g, 202h, and 202i because of the criteria defined in the second tag operation. Output stream 202f, which is the stream untagged by both operations, has the quantity value 204h. Output stream 202g, which is the stream untagged by the first tag operation and tagged by the second tag operation, has the quantity value 204f. Output stream 202h, which is the stream tagged by both operations, has the quantity value 204e. Output stream 202i, which is the stream tagged by the first tag operation and untagged by the second tag operation has the quantity value 204g. Each of output streams 202f and 202g is sized in relative proportion to the input stream 202d, in approximately the same ratio as the quantity values 204h and 204f are to the quantity value 204d for the input stream 202d. Likewise, each of output streams 202h and 202i is sized in relative proportion to the input stream 202e, in approximately the same ratio as the quantity values 204e and 204g are to the quantity value 204c for the input stream 202e. Thus, the user is immediately able to perceive the complex relationships between the different tag operations and filter operation, and thereby obtain both a qualitative and quantitative understanding of the impact and interaction of the various refine operations.

Following execution of the second tag operation, since all three operations have been executed, the run buttons 212a, 212b, and 212c are disabled, as the operations cannot be executed again. The cancel buttons 210a, 210b, and 210c are active, and any of the three operations may be independently canceled. Canceling the filter operation in the Filter Bay 208a results in the database management system 104 setting the tag operations back to an un-executed state in Tag Bay 1 (208b) and Tag Bay 2 (208c).

The ability to graphically define the second tag operation in the query construction area 200 in the context of the results of the first tag operation integrates query construction and result presentation, so that the user can directly manipulate the results of the previous operation in their next operation.

While the quantitative result of these two tag operations is the same as if the criteria for both tag operations were conjoined in a single operation, the visual display of these operations as separate operations enables the user to immediately perceive their differential impact on the data. Further, the user can easily remove one or the other tag operations to obtain the results from that remaining operation alone.

The user interface of the present invention may be used in a variety of different embodiments and implementations. These include:

Non-database queries: Instead of searching a database 106 for records, in one alternative embodiment, the Data Refinery 108 may be used to create queries and to present a graphical display of the results of querying other types of data. For example, the Data Refinery 108 may be implemented so that it searches text files for matching query strings, and displays the input and output streams sized in proportion to the number of matching strings to a total number of words, sentences, paragraphs, or other metric of the document(s). For example, a user would construct a tag operation to search a document for the word "Hoffsteader." An underlying text search engine would then tag the word 'Hoffsteader' in a text corpus by visually distinguishing it (e.g. with a distinct color or font) and displaying the query construction area 200 indicating, for example, an input stream having a quantity value equal to the total number of words in the corpus and output stream having a quantity value equal to the number of words (or proportion) of the same that are 'Hoffsteader.' The output stream would be sized to the input stream according to the ratio of these quantities.

A greater number of static bays of either type (filter or tag): In one alternative embodiment, the Data Refinery 108 may have additional static or fixed icon bays 208. For example, rather than having a single filter bay 208a, there may be two or more filter bays 208. Additional filter bays allow the execution and visualization of multiple filter operations. Rather than grouping all criteria into a single filter operation then, the user may define individual filter operations, one for each criterion, and see their distinct impact on the data. The output stream of a first filter operation would become the input stream to a second filter operation, and so forth for subsequent operations.

A reduced number of static bays of either type (filter or tag): In one alternative embodiment, the Data Refinery 108 would have fewer icon bays 208. For example, rather than having two tag bays 208b, 208c, an alternative embodiment may offer only one.

Instantiate bays dynamically: Rather than offering a fixed set of icon bays 208 into which the user drops refine operations, an alternative embodiment of the Data Refinery 108 instantiates icon bays 208 'on-the-fly,' that is, as refine operations are moved by the user into the query construction area 200. In this embodiment, the query construction area includes a pipe icon, a rectangular region without the shaped protuberances of the icon bays 208 as shown in FIG. 2. As the user moves refine operations to the pipe icon in the query construction area, both the refine icon 206 and the icon bay 208 would appear. Depending on the implementation of this embodiment, a user may either add an unlimited number of icon bays 208 or add a fixed maximum number of icon bays 208. The type of icon bay 208 and refine operation may be selected by the user prior to or after dragging. Alternatively, different portions of the query construction area 200 may be designated as either filter or tag areas, and the icon bay 208 and icon 206 instantiated of the corresponding type depending upon where the user places the refine operation.

In addition, the ordering of the icon bays 208 may be variably selected by the user. The illustrated embodiment of FIG. 2 shows the Filter Bay 208a occurring before the Tag Bays 208b, 208c. Instead, the user may decide to rearrange this order, for example with a Tag Bay 208b, followed by a Filter Bay 208a, followed by a Tag Bay 208c. This feature further enhances the user's ability to explore the relationships between various different refine operations, and hence the underlying relationships in the data.

Icon bays of only one type: Rather than offering both filter icon bays and tag icon bays, one alternative embodiment of the Data Refinery 108 would offer icon bays of only one type to support either filter or tag operations (depending on the implementation, the icon bays would be either static or instantiated dynamically). For example, some applications might not have the need for tagging, and would offer only filter bays.

Define refine operation directly from selected database items: In another embodiment, a refine operation may be defined by the user by selecting a database record from a database table or the like, and one or more fields from the record. The refine operation criteria are then defined as having the values for the selected fields, using an equals operator, and logical conjunction. In this embodiment, the Data Refinery displays a plurality of database items, and receives a selection of a field of an item in the database, along with a user selection of a portion of the set of potential values for including in the refine operation. The Data Refinery further receives a user selection of whether the refine operation selects (i.e. "=" or eliminates (i.e. "I") items having a field with a same value. The Data Refinery then generates a refine operation from the user selections, along with a refine icon representing and associated with the refine operation.

Fixed set of refine operations: In some applications it may be desirable to offer a fixed set of refine operations, thereby eliminating the need for creating refine operations from scratch using the Scratch Refiners tab. The fixed set of refine operations would be selected by the implementer based on the nature of the underlying data, and the needs of the user group.

Couple and uncouple pipe sections: In one alternative embodiment, the Data Refinery 108 would allow the user to selectively couple and uncouple the icon bays 208 in the query construction area 200. Coupling and uncoupling icon bays 208 changes the visual presentation of data flowing through the query construction area 200. When icon bays are uncoupled, e.g. there is graphical separation between the output stream of the Filter Bay and the input stream of Tag Bay 1 (as in FIG. 2 with the Filter Bay and Tag Bay 1 being uncoupled), the visual depiction of the input stream into the subsequent icon bay 208 (e.g. Tag Bay1 in FIG. 2) is reset to 100% of available pixel height and the visual display of output stream from the subsequent icon bay 208 is based on this total pixel height.

When icon bays 208 are coupled, the visual depiction of the input stream into a subsequent icon bay 208 remains at the same pixel height, and hence graphical size, as it had been in the output stream from the previous icon bay 208. This is illustrated in FIG. 2 where Tag Bay 1 and Tag Bay 2 are coupled.

In this alternative embodiment then, the user can selectively couple and uncouple icon bays as desired. This feature allows the user to alternatively explore the total impact of refine operations or the marginal impact of one operation in a series of operations. Uncoupling has the effect of increasing the absolute graphical size of the input and output streams, but maintaining their relative graphical size according to the ratios of their underlying quantities.

Save history of impact for playback: In one alternative embodiment, the visual state of the Data Refinery 108 is captured for subsequent viewing and analysis. This would allow the comparison of the results of one refine operation against those of another. For example, the same refine operation may be executed each day over the course of a month on a set of data that is periodically updated with new or modified records. At the end of the month, the user may play back the snapshots of the Data Refinery 108 to explore the varying impact of the refine operation from one execution to another.

Implementation

The present invention may be usefully implemented in a variety of different software architectures. In the preferred embodiment, the present invention is implemented in an object oriented language such as C++. Appendix A includes a source code listing of one preferred embodiment of the Data Refinery 108 in accordance with the present invention.

Generally, a software architecture suitable for implementing the present invention includes window objects for representing the Data Refinery 108 and each of the Refiner Control tabs 250, and the various database tables. Objects are also defined to represent the query construction area 200, icon bays 208, and refine icons 206. Each icon bay 208 object is then dynamically associated, in response to a drag-and-drop, with a refine icon 206 object.

Each icon 206 object includes data members for storing the criteria definitions provided by the user, including the various fields, values, operator, and logical relationships of the criteria, and methods for executing a filter operation and a tag operation. These methods interface to the underlying database 106, and construct a database query using the appropriate data manipulation language of the database (e.g. SQL), and the criteria defined by the user. The icon 206 objects also hold references to stream objects representing input and output streams, for passing data about the queries and query results to the streams.

Each stream object holds references (e.g. database table IDs) to records the database 106. In response to a user clicking the run button 212, the icon 206 object executes the appropriate method of an icon 206 object on the input stream data, and instantiates an output stream object which references the underlying matching data in the database 106. Each output stream 202 object computes its pixel height and width as described above according to the ratio of the input and output quantities. A query construction area 200 object manages the placement of the output streams 202.

I claim:

1. A graphical, computer implemented method of selecting data in a database of items, each item having a plurality of fields, the method comprising:
   a) displaying a query construction area on a display device, the query construction area having:
      a first area for graphically representing a first plurality of items prior to a refine operation;
      a second area for graphically representing a second plurality of items selected by the refine operation, the second plurality of items being a subset of the first plurality of items; and
      an icon bay for receiving a refine icon the refine operation, the icon bay displayed between the first and second areas in the query construction area;
   b) displaying in the first area a first graphical representation of the first plurality of items;
   c) receiving a refine icon into the icon bay from a user input, the refine icon representing at least one refine operation that selects items in the database;
   d) executing the refine operation associated with the refine icon to select the second plurality of items; and
   e) displaying in the second area a second graphical representation of the second plurality of items, the second graphical representation sized relative to the first graphical representation in approximate proportion as to a ratio of the second plurality of items to the first plurality of items.

2. The method of claim 1, wherein receiving a filter icon into the icon bay from a user input with the input device comprises:
   displaying a plurality of database items;
   receiving a selection of a field of an item in the database, the field having a value;
   receiving from the user a selection of a portion of the set of potential values for including in the filter;
   receiving from the user a selection of whether the filter selects or eliminates items having a field with a value in the select portion;
   generating a filter operation from the user selections; and
   generating a filter icon and associating the filter icon with the generated filter operation.

3. The method of claim 1, wherein the refine operation is a filter operation.

4. The method of claim 1, wherein the refine operation is a tag operation that selectively identifies the second plurality of items within the first plurality of items.

5. The method of claim 1, wherein receiving a refine icon into the icon bay from a user input, the refine icon representing at least one refine operation that selects items in the database, further comprises:
   displaying concurrently with the query construction area a list of the fields of the database items, and a list of values for a selected one of the fields;
   receiving a user selection of at least one field and at least one value to define the refine operation;
   receiving a user selection of the icon bay for receiving the refine operation;
   instantiating a refine icon associated with the refine operation; and
   displaying the instantiated refine icon in the icon bay.

6. The method of claim 1, wherein receiving a refine icon into the icon bay from a user input, the refine icon representing at least one refine operation that selects items in the database, further comprises:
   displaying a plurality of previously defined and stored refine operations;
   receiving a selection of one of the stored refine operations; and
   instantiating a refine icon representing the selected refine operation; and
   displaying the instantiated refine icon in the icon bay.

7. The method of claim 1, wherein the query construction area is based on the visual metaphor of a pipe through which liquid flows, the refine operation graphically represented as an obstruction in the query construction area, the first plurality of items graphically represented as streams flowing into the obstruction, and the second plurality of items graphically represented as streams flowing out of the obstruction.

8. A graphical, computer implemented method of selecting data in a database of items, each item having a plurality of fields, the method comprising:
   a) displaying a query construction area on a display device, the query construction area having a first refine area including:

a first area for graphically representing a first plurality of items prior to a first refine operation;

a second area for graphically representing a second plurality of items resulting from the first refine operation, the second plurality of items being a subset of the first plurality of items; and a first icon bay for graphically representing a first refine icon representing the first refine operation, the first icon bay displayed between the first and second areas;

b) displaying a second refine area in the query construction area, the second refine area having:

a third area for graphically representing the second plurality of items prior to a second refine operation;

a fourth area for graphically representing a third plurality of items resulting from the second refine operation, the third plurality of items being a subset of the second plurality of items; and a second icon bay for graphically representing a second refine icon representing the second refine operation, the second icon bay displayed between the third and fourth areas;

c) displaying in the first area a first graphical representation of the first plurality of items;

d) receiving a first refine icon into the first icon bay from a user input, the first refine icon representing a first refine operation that selects items in the database;

e) executing the first refine operation associated with the first refine icon to select the second plurality of items from the first plurality of items;

f) displaying in the second area a second graphical representation of the second plurality of items, the second graphical representation sized relative to the first graphical representation in approximate proportion as to a ratio of the second plurality of items to the first plurality of items;

g) displaying in the third area a third graphical representation of the second plurality of items;

h) receiving a second refine icon into the second icon bay from a user input, the second refine icon representing a second refine operation;

i) executing the second refine operation associated with the second refine icon to select the third plurality of items only from the second plurality of items; and j) displaying in the fourth area a fourth graphical representation of the third plurality of items, the fourth graphical representation sized relative to the third graphical representation in approximate proportion as to a ratio of the third plurality of items to the second plurality of items.

9. The method of claim 8, further comprising:

receiving a user input to couple the second area to the third area;

resizing the third graphical representation to be a same size as the second graphical representation; and resizing the fourth graphical representation relative to the third graphical representation so as to maintain the approximate proportion as to the ratio of the third plurality of items to the second plurality of items.

10. A graphical, computer implemented method of selecting data in a database of items, each item having a plurality of fields, the method comprising:

a) displaying a query construction area on a display device, the query construction area having a first filter area including:

a first area for graphically representing a first plurality of items prior to a first filter operation;

a second area for graphically representing a second plurality of items resulting from the first filter operation, the second plurality of items being a subset of the first plurality of items; and a first icon bay for graphically receiving a first filter icon representing the first filter operation, the first icon bay displayed between the first and second areas;

b) displaying in the query construction area a first tag area on a display device simultaneously with the first filter area, the first tag area having:

a third area for graphically representing the second plurality of items prior to a first tag operation;

a fourth area for graphically representing a third plurality of items resulting from the first tag operation, the third plurality of items being a subset of the second plurality of items;

a second icon bay for graphically receiving a first tag icon representing the first tag operation, the second icon bay displayed between the third and fourth areas;

c) displaying in the first area a first graphical representation of the first plurality of items;

d) receiving a first filter icon into the first icon bay from a user input with the input device, the first filter icon representing a first filter operation that selects items in the database;

e) executing the first filter operation associated with the first filter icon to select the second plurality of items from the first plurality of items;

f) displaying in the second area a second graphical representation of the second plurality of items, the second graphical representation sized relative to the first graphical representation in approximate proportion as to a ratio of the second plurality of items to the first plurality of items;

g) displaying in the third area a third graphical representation of the second plurality of items;

h) receiving a first tag icon into the second icon bay from a user input with the input device, the first tag icon representing a first tag operation;

i) executing the first tag operation associated with the first tag icon to select the third plurality of items only from the second plurality of items; and j) displaying in the fourth area a fourth graphical representation of the third plurality of items, the fourth graphical representation sized relative to the third graphical representation in approximate proportion as to a ratio of the third plurality of items to the second plurality of items.

11. The method of claim 10, further comprising:

displaying a list of the plurality of items of the database; and for each of the third plurality of items, graphically distinguishing the item from the remaining items.

12. A user interface for a computer system including a database of items and a display device, the user interface displayed on the display device and for selecting data in the database, the user interface comprising:

a query construction area including:

an input stream area for displaying a first graphical representation of a first plurality of items of the database, the first plurality of items being an input set to a filter operation;

a first output stream area for displaying a second graphical representation of a second plurality of items of the database, the second plurality of items being the output set of the filter operation, and being a subset of the first plurality of items, the second graphical representation sized relative to the first graphical representation in approximate proportion as to a ratio of the second plurality of items to the first plurality of items; and at least one filter icon bay displayed between the input stream area and the first output stream area for receiving a filter icon, the filter icon associated with the filter operation that executes on the first plurality of items in the database to select the second plurality of items.

13. The user interface of claim 12, further comprising:

a first window, for defining at least one criterion for the filter operation, each criterion including a field, a value, and an operator, the first window concurrently displayed with the query construction area, and including:
a list of fields for items in the database;
a list of values of a selected one of the fields;
a list of operators; and
a control for selecting conjunction or disjunction between a first and a second criterion.

14. The user interface of claim 12, wherein the query construction area further comprises:

at least one tag icon bay displayed for receiving a tag icon, the tag icon associated with the tag operation that executes on the second plurality of items in the database to tag a third plurality of items matching criteria of the tag operation and to leave untagged a fourth plurality of items not matching criteria of the tag operation;

a second output stream area for displaying a third graphical representation of the third plurality of items, and a fourth graphical representation of the fourth plurality of items, the third graphical representation sized relative to the second graphical representation in approximate proportion as to a ratio of the third plurality of items to the second plurality of items, and the fourth graphical representation sized relative to the second graphical representation in approximate proportion as to a ratio of the fourth plurality of items to the second plurality of items; and wherein the tag bay is displayed between the first output stream and the second output stream.

15. The user interface of claim 14, further comprising:

a first window, for displaying a status of the filter icon bay, and a status of the tag icon bay, each status selectively displaying each criterion of the filter operation or tag operation associated respectively with the filter icon bay or tag icon bay.

16. The user interface of claim 12, wherein the query construction area is based on the visual metaphor of a pipe through which liquid flows, the filter icon graphically represented as an obstruction in the query construction area, the first plurality of items graphically represented as streams flowing into the obstruction, and the second plurality of items graphically represented as streams flowing out of the obstruction.

17. A user interface for constructing query operations on a database and concurrently representing results from such query operations, each query operation operating upon input data from the database, and producing output data, the user interface comprising:

a query construction area based on the visual metaphor of a water pipe through which water flows;

a first graphical representation of a query operation as an obstruction in the query construction area;

a second graphical representation of input data to the query operation as streams flowing into the first graphical representation of the query operation; and a third graphical representation of output data produced by the query operation as streams flowing out of the first graphical representation of the query operation.

18. The user interface of claim 17, wherein:

the third graphical representation of output data produced by a query operation has a graphical size that is proportional to the second graphical representation of input data to the query operation in approximately a ratio of a quantity of the output data to a quantity of the input data.

19. A user interface for a computer system including a database of items and a display device, the user interface displayed on the display device and for selecting data in the database, the user interface comprising:

a first area for displaying a first graphical representation of a first plurality of items in the database prior to a query being executed on the database;

a second area concurrently displayed with the first area for displaying a second graphical representation of a second plurality of items resulting from the query, the second graphical representation sized relative to the first graphical representation in approximate proportion as to a ratio of the second plurality of items to the first plurality of items;

a third area displayed between the first and second areas for receiving a third graphical representation of the query to be executed on the database.

20. The user interface of claim 19, wherein the third area comprises an icon bay for graphically receiving a query icon representing the query to be executed.

21. A computer implemented method of creating and graphically representing a query in a single user interface, the method comprising:

a) displaying a query construction area on a display device, the query construction area having:
a first area for displaying a first graphical representation of a first plurality of items in a database prior to a query being executed on the database;
a second area concurrently displayed with the first area for displaying a second graphical representation of a second plurality of items resulting from the query; and
a third area displayed between the first and second areas for receiving a third graphical representation of the query to be executed on the database;

b) displaying the first graphical representation of the first plurality of items;

b) receiving in the third area the third graphical representation of the query to be executed;

c) executing the query on the database; and d) displaying concurrently with the first graphical representation the second graphical representation of the second plurality of items, the second graphical representation sized relative to the first graphical representation in approximate proportion as to a ratio of the second plurality of items to the first plurality of items.

* * * * *

UNITED STATES PATENT AND TRADEMARK OFFICE
CERTIFICATE OF CORRECTION

PATENT NO. : 6,208,985 B1
DATED : March 27, 2001
INVENTOR(S) : Gregory A. Krehel.

It is certified that error appears in the above-identified patent and that said Letters Patent is hereby corrected as shown below:

Title page,
Item [22], replace "Jul. 10, 1997" with -- Jul. 9, 1997 --.

Signed and Sealed this

Sixth Day of November, 2001

Attest:

*Nicholas P. Godici*

NICHOLAS P. GODICI
*Attesting Officer*     *Acting Director of the United States Patent and Trademark Office*